US006827760B2

(12) United States Patent
Kutt et al.

(10) Patent No.: US 6,827,760 B2
(45) Date of Patent: *Dec. 7, 2004

(54) METHOD AND SYSTEM FOR PROVIDING A DESIRED ATMOSPHERE WITHIN AN ENCLOSURE

(75) Inventors: Lawrence M. Kutt, Boulder, CO (US); Mark Jellison, Boulder, CO (US); Joseph Boatman, Boulder, CO (US)

(73) Assignee: Colorado Altitude Training LLC, Boulder, CO (US)

( * ) Notice: Subject to any disclaimer, the term of this patent is extended or adjusted under 35 U.S.C. 154(b) by 58 days.

This patent is subject to a terminal disclaimer.

(21) Appl. No.: 10/423,692

(22) Filed: Apr. 25, 2003

(65) Prior Publication Data

US 2003/0209140 A1 Nov. 13, 2003

Related U.S. Application Data

(63) Continuation of application No. 09/948,410, filed on Sep. 6, 2001, now Pat. No. 6,565,624.
(60) Provisional application No. 60/230,946, filed on Sep. 6, 2000.

(51) Int. Cl.[7] .......................... B01D 53/02; A63B 23/18
(52) U.S. Cl. ............................... 95/8; 55/385.2; 95/11; 95/25; 95/26; 96/111; 96/115; 96/116; 96/117; 128/202.12; 128/205.26
(58) Field of Search ........................ 55/385.2; 454/187; 128/205.11, 202.12, 205.12, 205.26; 95/1, 8, 11, 12, 25, 26; 96/111, 109, 115, 116, 117, 417

(56) References Cited

U.S. PATENT DOCUMENTS 2,373,333 A    4/1945  Onge ............................ 257/9
3,215,057 A   11/1965  Turek .......................... 98/1.5

(List continued on next page.)

FOREIGN PATENT DOCUMENTS

| DE | 3101618 | 11/1982 | ............ F24F/3/12 |
| EP | 0 277 787 | 4/1993 | .......... A61G/10/02 |
| WO | WO 96/19265 | 6/1996 | .......... A63B/23/18 |
| WO | WO 98/34683 | 8/1998 | ............ A62B/7/10 |
| WO | WO 01/39837 | 6/2001 | |

OTHER PUBLICATIONS

"OBS: Advanced Breathing Technology"; *OBS AS*; .
Letter (w/enclosures) from Arc ProKop, VP of Hypoxico Inc. to the U.S. Patent Office dated Jul. 31, 2002; 2 pgs.
Letter from Joseph Kovarik to Igor Kotliar dated Nov. 30, 1999; 2 pgs.
Search Results from International Search Report dated Feb. 8, 2002 in International Patent Application No. PCT/US01/28145; 1 pg.
Letter from Andrew L. Tlajoloff to Joseph E. Kovarik dated Dec. 29, 2000; 1 pg.

(List continued on next page.)

*Primary Examiner*—Duane S. Smith
(74) *Attorney, Agent, or Firm*—Sheridan Ross P.C.

(57) ABSTRACT

A system and method for passive hypoxic training provides a person with a low oxygen (hypoxic) environment. Oxygen sensors automatically monitor and control oxygen levels to maintain the altitude desired. $CO_2$ levels are monitored and $CO_2$ is eliminated so that the air a person breathes is substantially clean and fresh. Exposure to a high altitude environment produces physiological changes in a person's body, which becomes more efficient at absorbing and transporting oxygen. Using the present method and system, athletes obtain the benefits of sleeping at a simulated altitude in the user's own home for six to twelve hours, rather than traditional altitude therapies in which athletes spend two to three weeks at high altitude before an athletic competition to obtain similar benefits. This system allows for "live high train low" altitude training that has been shown in controlled studies to provide superior benefits to "live high train high" training.

14 Claims, 26 Drawing Sheets

Portable CMR, configured for use as a high altitude room.

U.S. PATENT DOCUMENTS

| | | | |
|---|---|---|---|
| 3,415,310 A | 12/1968 | Kuhlmann | 165/27 |
| 3,565,072 A | 2/1971 | Gauthler | 128/212 |
| 3,587,574 A | 6/1971 | Mercer | 128/204 |
| 4,516,424 A | 5/1985 | Rowland | 73/23 |
| 4,627,860 A | 12/1986 | Rowland | 55/162 |
| 4,648,888 A | 3/1987 | Rowland | 55/21 |
| 5,101,819 A | 4/1992 | Lane | 128/204.18 |
| 5,109,837 A | 5/1992 | Gamow | 128/202.12 |
| 5,133,339 A | 7/1992 | Whalen et al. | 128/25 R |
| 5,188,099 A | 2/1993 | Todeschini et al. | 128/205.26 |
| 5,398,678 A | 3/1995 | Gamow | 128/205.26 |
| 5,467,764 A | 11/1995 | Gamow | 128/202.12 |
| 5,685,293 A * | 11/1997 | Watt | |
| 5,799,652 A | 9/1998 | Kotliar | 128/205.11 |
| 5,846,291 A | 12/1998 | Delp, II | 95/8 |
| 5,850,833 A | 12/1998 | Kotliar | 128/202.12 |
| 5,860,857 A | 1/1999 | Wasastjerna et al. | 454/338 |
| 5,906,672 A | 5/1999 | Michaels et al. | 95/12 |
| 5,917,135 A | 6/1999 | Michaels et al. | 95/11 |
| 5,924,419 A | 7/1999 | Kotliar | 128/205.11 |
| 5,935,516 A * | 8/1999 | Baugh | |
| 5,964,222 A | 10/1999 | Kotliar | 128/205.26 |
| 5,988,161 A * | 11/1999 | Kroll | |
| 6,016,803 A * | 1/2000 | Volberg et al. | |
| 6,508,850 B1 * | 1/2003 | Kotliar | |
| 6,561,185 B1 * | 5/2003 | Kroll | |
| 6,565,624 B2 * | 5/2003 | Kutt et al. | |

OTHER PUBLICATIONS

Letter from Larry Kutt to Nicholas Chotin dated Nov. 6, 1997; 1 pg.

Letter from Colorado Altitude Training to Gary Kotlier dated Jul. 29, 1998; 1 pg.

Letter from Larry Kutt to Garry Kotlier dated Jul. 30, 1998; 1 pg.

Letter from Larry Kutt to Gary Kotlier dated Feb. 10, 1999; 1 pg.

Web page; "CAT About Colorado Mountain Room", *Colorado Altitude Training*, Feb. 19, 2002; 2 pgs.; http://www.altitudetraining.com/about.htm.

Web page: "CAT: About Colorado Mountain Room"; *Colorado Altitude Training*; Feb. 15, 2000; pg. 1 of 2; http://www.altitudetraining.com/abouthtm.

Web page: "CAT Altitude Training for the New Millennium"; *Colorado Altitude Training*; Feb. 15, 2000; 2 pgs.; http://www.altitudetraining.com/pr4.htm.

Web page: "We are the Official Suppliers to the Norwegian Olympic Committee"; *Colorado Altitude Training*; Feb. 15, 2000; pgs. 2 and 3 of 4; http://www.altitudetraining.com/default.htm.

Web page: "Q: How does the Colorado Mountain Room Create Altitude?"; *Colorado Altitude Training*; Feb. 15, 2000; pg. 5 of 6; http://www.altitudetraining.com/FAQ.htm.

Email from Shaun [shaun@hypoxico.com]to Gary [gary@hypoxio.net]; *Hypoxico*; May. 6, 2000: 1 pg.

* cited by examiner

| Room Size | |
|---|---|
| Length (ft) | 10 |
| Width (ft) | 10 |
| Height (ft) | 10 |
| Altitude of Site (ft asl) | 5500 |
| Number of People in Room | 1 |
| $O_2$ Removal Rate (slpm) | 5 |
| Number of Systems | 1 |
| Per Person Heat Generation (w/m²) | 45 |
| Initial $O_2$ Content (%) | 20.94 |
| Outdoor $CO_2$ Concentration (ppmv) | 400 |
| Initial Room $CO_2$ Conc. (ppmv) | 400 |
| $CO_2$ Scrubber Air Flow Rate (cfm) | 0 |
| $CO_2$ Scrubber Efficiency (%) | 80 |
| Air Change Rate (ACH, hr⁻¹) | 0.1 |

The Information Required for Initializing The Computer Model.

*FIG. 1*

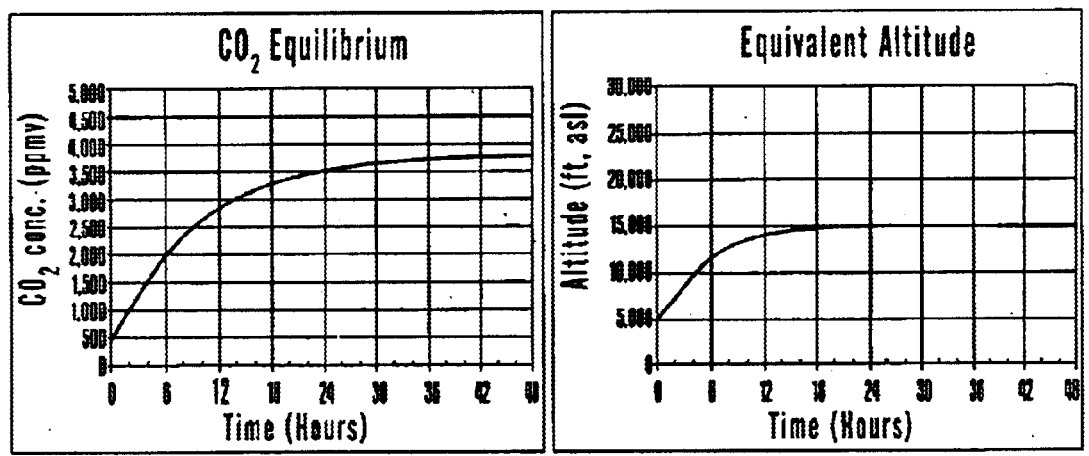

The Predicted $CO_2$ Concentration and Simulated Altitude Inside the Colorado Mountain Room as a Function of Time.

*FIG. 3*

The Colorado Mountain Room as configured
for use in a person's bedroom.

The Colorado Mountain Room, configured for use as a low altitude room.

The Colorado Mountain Room, configured for use as a high $CO_2$ room.

Portable CMR, configured for use as a
high altitude room.

Portable CMR, configured for use as a high altitude room.

Portable CMR, configured for use as a high altitude room.

Portable CMR, configured for use as a high altitude room.

Portable CMR, configured for use as a
high altitude room

A flowchart for the calibration, averaging, and pressure compensation of the oxygen sensor.

Colorado Altitude Training
Oxygen & CO₂ Variations in Rooms of Different Sizes
Directions for using this spread sheet
Change numbers in red only.

| Room Size | |
|---|---|
| Length (ft) | 10 |
| Width (ft) | 10 |
| Height (ft) | 10 |
| Room Volume (ft$^3$) | 1000 |
| Room Volume (l) | 28,317 |
| Altitude of Site (ft asl) | 800 |
| Sea Level Pressure (mb) | 1013.25 |
| Station Pressure (mb) | 985 |
| Number of People in Room | 0 |
| O₂ Removal Rate per System (slpm) | 5 |
| Number of Systems | 1 |
| Per Person Surface Area (m$^2$) | 1.8 |
| Per Person Heat Generation (w/m$^2$) | 45 |
| Resp. Coefficient (dimensionless) | 0.83 |
| Per Person O$_2$ Consumption (slpm) | 0.239477195 |
| Per Person CO$_2$ Production (slpm) | 0.198766072 |
| Initial O$_2$ Content (%) | 20.94 |
| Initial Simulated Pressure (mb) | 985 |
| Initial Simulated Altitude (ft) | 800 |
| Outdoor CO$_2$ Concentration (ppmv) | 400 |
| Initial Room CO$_2$ Conc. (ppmv) | 400 |
| CO$_2$ Scrubber Air Flow Rate (cfm) | 10 |
| CO$_2$ Scrubber Efficiency (%) | 80 |
| Air Change Rate (ACH, hr$^{-1}$) | 0.043 |

*FIG. 19*

METHOD AND SYSTEM FOR PROVIDING A DESIRED ATMOSPHERE WITHIN AN ENCLOSURE

RELATED APPLICATION

The present application is a continuation of prior U.S. patent application Ser. No. 09/948,410 filed Sep. 6, 2001, entitled "ALTITUDE SIMULATION METHOD AND SYSTEM," now U.S. Pat. No. 6,565,624 which claims priority from U.S. Povisional Patent Application No. 60/230,946, filed Sep. 6, 2000. The entire disclosure of the prior applications are considered to be part of the disclosure of the accompanying application and are incorporated herein by reference.

FIELD OF THE INVENTION

The present invention is directed to a method and system simulating altitude changes in an enclosed space, and particularly, is directed to a method and system in which ambient oxygen and carbon dioxide levels are monitored and adjusted to provide desired physiological benefits derived from a person or animal spending time in an altitude environment to improve athletic performance and/or to relieve altitude sickness symptoms for other individuals. High and low oxygen environments affect the physiology in different ways providing health and athletic benefits.

BACKGROUND OF THE INVENTION

Going to a higher altitude or reduced oxygen environments is safe when done properly. Millions of air travelers experience high altitude when they fly in aircraft pressurized to 6–8,000 feet. Hundreds of thousands of tourists visit Colorado's high country and stay at altitudes ranging from 8,000 feet (Vail or Aspen, Colo., USA) to 11,000 feet (Leadville, Colo., USA). These same tourists enjoy shorter stays at 12,000 feet (top of Loveland Pass) to 14,000 feet (top of Pikes Peak).

However, medical problems due to high altitude include a number of uncomfortable symptoms and some potentially dangerous conditions, all resulting from the decrease in the oxygen concentration in the blood. Altitude sickness is not a specific disease but is a term applied to a group of rather widely varying symptoms caused by altitude. The primary cause is decreased oxygen. People react differently to altitude at different times and different people react differently to altitude. Physical fitness does not confer any protection against acute mountain sickness and does not facilitate acclimatization. Altitude effects result from the lower oxygen content of the air—not from the lower barometric pressure. At 18,000 feet the amount of oxygen molecules per cubic foot of air is approximately one half that of sea level.

Additionally, going too high too fast causes altitude sickness. When a person is exposed to a higher altitude for longer periods, he/she acclimatizes to the higher altitude. By acclimatizing slowly, a person can usually avoid the symptoms of altitude sickness. Symptoms of altitude sickness may include: nausea, headaches, sleeplessness, weakness, malaise, difficulty breathing, feeling "hung over", lethargy, a loss of appetite, altered thinking, and/or feeling "intoxicated".

During acclimatization there is an increase the body's efficiency in absorbing, transporting, delivering and utilizing oxygen. The most important processes in acclimatization are:

(a) An increase in respiratory rate and volume. This change usually begins at around 3,000 feet and may not reach a constant value until several days after arrival at high altitude.

(b) Changes in the pulmonary circulation. During exposure to any kind of low oxygen environment, including high altitude, the pressure in the pulmonary arteries is elevated and the capillaries of the lung are more fully infused with blood increasing the capacity of the circulatory bed of the lung to absorb oxygen.

(c) An increase in the number of red blood cells. Shortly after arrival at high altitude an increase in the number of red blood cells in the blood occurs. Later red blood cell production by the bone marrow is increased so that the blood contains more red cells than at sea level. Since the red cells carry oxygen the increased number of red cells permits each unit of blood to carry more oxygen. This process reaches its maximum in about six weeks.

(d) Increased cardiac output. During the first few days at high altitude, the volume of blood pumped by the heart per minute is increased, which increases the rate of oxygen delivery to the tissues.

(e) Changes in the tissues of the body. Prolonged exposure to altitude is accompanied by the changes in the tissues that use oxygen, particularly muscle, which permit normal function at very low oxygen pressures. These changes include an increase in the number of capillaries within the tissue, and an increase in the concentration of enzymes, which extract oxygen from hemoglobin, as well as an increase in the volume of mitochondria, which are the cellular structures within which these enzymes are located.

The physiological effects of altitude acclimatization have been documented for many years. These effects include:

(a) An increase in total blood volume
(b) An increase in red blood cell mass
(c) An increase in VO2 max—the maximum amount of oxygen the body can convert to work
(d) An increase in hematocrit, the ratio of red blood cells to total blood volume
(e) An increase in the lungs ability to exchange gases efficiently Together these changes produce an increase in the oxygen carrying capacity of the blood and the body's ability to use the oxygen transported resulting in a major difference in the body's ability to perform work both at altitude and at sea level. The net result of such changes is an improvement in athletic performance.

The time required for the different adaptive processes is variable. The respiratory and biochemical changes are typically complete in six to eight days. The increase in the number of red blood cells is about 90 percent of maximum at three weeks. In general, about 80% of adaptation is completed by 10 days and 95% is completed in six weeks. Longer periods of acclimatization result in only minor increases in high altitude performance. However, continued exposure to altitude does maintain the physiological acclimatization. After return to sea level, acclimatization starts to be lost after 10–15 days. Red blood cell counts remain higher for up to 6 weeks.

Living at a high altitude is essential to maximize the oxygen carrying capacity of the blood and improving athletic performance. In their landmark study published in the July 1997 issue of the Journal of Applied Physiology, Dr Benjamin Levine and Dr. James Strey-Gundersen of the University of Texas Southwestern Medical Center demonstrated convincingly that athletes perform best when living (including sleeping) at high altitude and training at low altitude. Their study of 39 elite runners showed a marked increase in performance (at sea level as well as at altitude) among the group that lived at high altitude and drove down to low altitude for training. There was no performance improvement in any of the other groups (living high and training high, living low training low, or living low and training high.).

Further studies have also shown that training at low altitude is critical to getting the best quality training. At high altitude the blood is not fully saturated with oxygen. While the athlete's blood would be 97–98% saturated with oxygen at sea level it may be only 80% saturated at 14,000 feet. As a result the athlete at altitude is unable to work or train as hard. U.S. Olympic Team cyclists at their high altitude training camp found they could work harder by riding cycling ergometers while wearing oxygen masks to simulate sea level. A rider that could put out 400 watts at altitude could put out 480 watts at sea level with the same perceived exertion. In short, athletes benefit more from their training at sea level than from training at high altitude. This study and others show that the optimal training program includes living high and training low.

Research shows that the body's production of erythropoietin (the natural glycoprotein produced by the kidneys that signals the bone marrow to make more red blood cells) goes up dramatically as altitude increases from 6,000 feet (30% increase over sea level) to 14,500 feet (300% increase over sea level.) Most training regimens simply do not train the athlete at low enough elevations while allowing them to sleep at high enough elevations to gain the maximum benefit from training. In a preferred embodiment, it is recommended that a person sleep at an altitude of 8,000–13,000 feet for the maximum acclimatization effect, after a period of acclimatization at lower altitudes.

What limits exercise at high altitude is the lack of oxygen concentration. Mountain air contains less oxygen than air at sea level. By reducing the amount of oxygen in the room the equipment simulates high altitude.

The amount of exercise that can be performed at high altitude is less than at sea level and the heart rate reached during maximal exercise is less. This indicates less cardiac work. Maximal exercise capacity decreases progressively with higher altitudes. So it would be desirable to sleep high and train low.

The beneficial effect of sleeping high and training low is that the oxygen processing capacity of the body is increased. This allows the body to do more work (run, swim, ski, or cycle faster) at the same level of physical exertion and heart rate. The body can also perform the same amount of work as it did prior to living high and training low at lower exertion rates and lower heart rates. The athlete can remain in an aerobic state longer and work harder without becoming anaerobic. The athlete can perform at higher levels while still using fat as a fuel instead of sugars. This allows for greater performance levels and faster times while decreasing lactic acid production.

Research has also shown that athletes who train at low altitude but live at high altitude perform better in endurance, and running speed, than athletes who train and live at high altitude or who live and train at low altitude. "High-low" athletes also recover faster and increase their VO2 max. Moreover, when people plan to participate in an athletic event at high altitude it is desirable to train at high altitude before the event to acclimatize to the conditions. Therefore, there is a need to simulate both high altitudes and low altitudes.

There have been various attempts at providing systems for simulating a different altitude from the altitude that a person resides in order to presumably address the debilitating effects of increased altitude, and/or to obtain some of the advantages of purposely simulating different altitudes for, e.g., athletic training. Some of these are discussed immediately below.

Heiki Rusko in Finland introduced nitrogen into an enclosed house using bottled nitrogen to reduce oxygen levels in an altitude house. This approach suffered from high cost, low convenience and an inability to control $CO_2$. Only high altitude was simulated, not low altitude.

Nils Ottestad in Norway improved upon this concept by using an oxygen concentrator, a magnetic gate, a fan, a $CO_2$ scrubber, oxygen sensors, and $CO_2$ sensors. In his invention, the oxygen concentrator was running at all times. A user activated the $CO_2$ scrubber. Oxygen sensors measured oxygen levels and sent data to a control panel that only controlled the alarm, the magnetic gate, and a fan. This approach suffered from requiring the user to control the $CO_2$ scrubber and a general lack of sophistication. The control panel did not control the oxygen concentrator, the $CO_2$ scrubber, or the high $CO_2$ alarm. Fans were not employed in high $CO_2$ situations. Only high altitude was simulated, not low altitude.

Additionally, U.S. Pat. Nos. 5,964,222 filed Dec. 3, 1997, 5,799,652 filed Jul. 21, 1995, 5,924,419 filed Feb. 8, 1997, and 5,850,833 filed May 22, 1995, all of which have Kotliar as the inventor, describe the use of an oxygen concentrator to introduce nitrogen into an environment to thereby provide oxygen depleted air. This approach suffers from a limited ability to control altitude and $CO_2$ levels. Moreover, Kotliar's systems are only capable of simulating high, rather than low altitudes.

Accordingly, it would be desirable to have a more cost effective method and apparatus that could better simulate variable altitudes, and in particular, easily simulate both lower and higher altitudes than the current altitude of a person.

DEFINITION OF TERMS

Simulated altitude, or physiological altitude is defined to be the partial pressure of oxygen that corresponds to a particular actual altitude. The partial pressure of oxygen is influenced by the oxygen concentration and the atmospheric pressure.

SUMMARY OF THE INVENTION

The present invention is referred to herein as a "Colorado Mountain Room" (also denoted as CMR herein) and encompasses both a method and a system for adjusting $O_2$ and $CO_2$ levels to provide benefits to, e.g., the training of athletes, the treating or preventing altitude of sickness as well as other altitude or altitude change related conditions. For example, high oxygen environments relieve symptoms of altitude sickness and allow for people to sleep more easily. In one embodiment the Colorado Mountain Room controls oxygen levels in a room, for both allowing the user to simulate high altitudes (low oxygen) for purposes of altitude acclimatization and athletic training, and to simulate low altitude (high oxygen levels) for athletic training. In one embodiment, the Colorado Mountain Room requires a reasonably well sealed environment (a room or enclosure such as a tent). However, alternative embodiments that are "leaky" can be provided.

The Colorado Mountain Room may have penetrations through the walls to allow for the passage of hoses, and to allow for the controlled passage of air through a gated penetration. In one embodiment, the present invention includes the following components (i.e., the "equipment"):

(a) A oxygen concentrator—This may be a molecular sieve to separate oxygen and nitrogen molecules. Such a molecular sieve removes approximately 5 liters of oxygen from the room per minute.

(b) A $CO_2$ sensor—this measures the amount of $CO_2$ in the room. $CO_2$ is produced by breathing.

(c) A $CO_2$ scrubber—This eliminates $CO_2$ to keep the air fresh and clean within the CMR.

(d) An oxygen sensor—This measures the amount of oxygen in the room within the CMR.

(e) A temperature sensor—This sensor measures the temperature within the Colorado Mountain Room.

(f) An ambient pressure sensor—This sensor measures the ambient air pressure in the Colorado Mountain Room.

(g) A ventilation fan, a vent, a gate, blower, etc.—This brings in fresh air into CMR when oxygen levels therein fall below desired levels, or carbon dioxide levels rise above desired levels, and if either oxygen or $CO_2$ are outside of their safe range.

(h) A controller—This controller controls the oxygen concentrator, a $CO_2$ scrubber, and the ventilation fan for altering the percentage of oxygen in the room, removing carbon dioxide, and bringing in fresh air and monitoring oxygen and carbon dioxide levels. If either oxygen or carbon dioxide levels are out of their safe ranges an alarm of the present invention is triggered and the ventilation fan is turned on to bring fresh air into the room. The oxygen sensor, the $CO_2$ sensor, the temperature sensor, and the ambient pressure sensor are also connected to the controller. The computerized controller includes a computer, an analog-to-digital converter module, a relay output module, a viewing panel, and appropriate power supplies. The controller's computer: (i) activates and deactivates the attached above-identified oxygen concentrator, $CO_2$ scrubber, and ventilation fan, and (ii) displays information on a digital control panel (also denoted a visual display panel herein) using the signals received from the above-identified sensors.

(i) An uninterruptible power source—This power source powers the sensors, the control panel and the ventilation fan in case of a power outage.

In one embodiment, the equipment identified above is sized to operate within a tightly sealed room of about 1,000 cubic feet. The ability of the equipment to create an altitude simulation space is dependent on the room's air infiltration rate and oxygen removal rate, or nitrogen introduction rate of the equipment.

BRIEF DESCRIPTION OF THE DRAWINGS

The drawings constitute a part of this specification and include an exemplary embodiment of the invention, which may be embodied in various forms. It is to be understood that in some instances various aspects of the invention may be shown exaggerated or enlarged to facilitate an understanding of the invention.

FIG. 1 illustrates the information to be input in at least one embodiment of the CMR.

FIG. 3 shows an example of these predictions obtained from the prediction model of the present invention when using the initial conditions given in FIG. 1.

FIG. 19 shows another set of input or initialization data for the predictive computer model.

DETAILED DESCRIPTION

Figure 2:
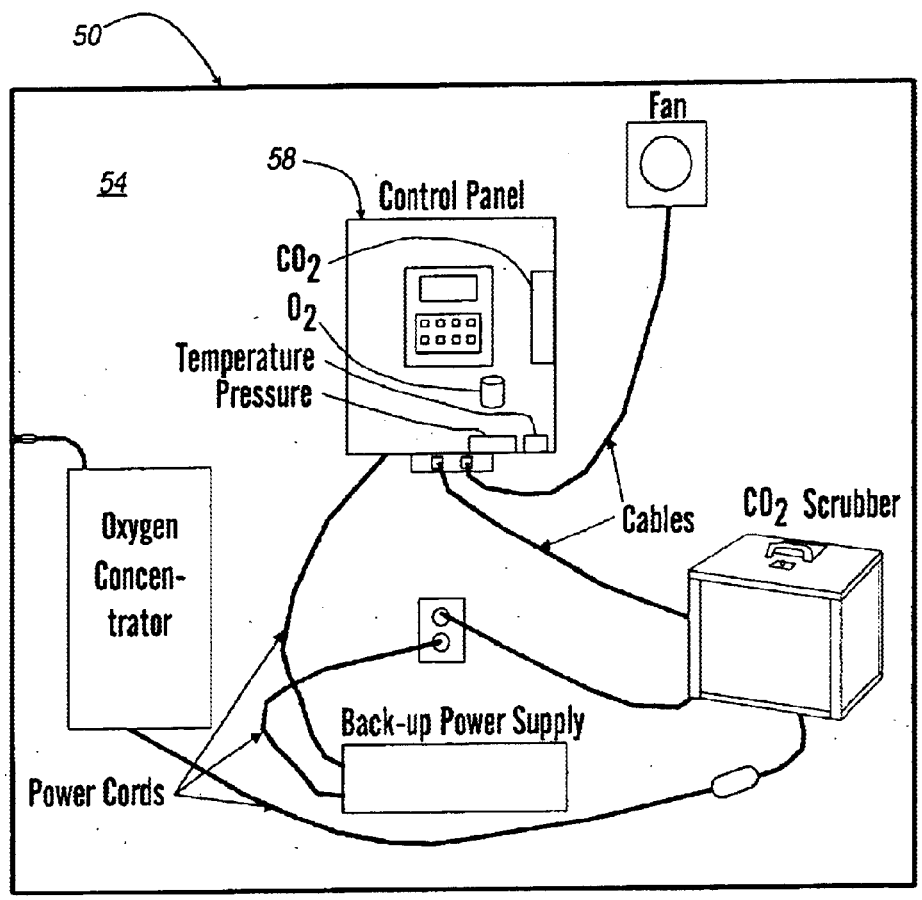
FIG. 2 shows the various components of an embodiment of the present invention when installed in a user's bedroom.

The essential features of the present invention are set forth above in the Summary of the Invention and are depicted generally in the embodiments in the accompanying figures. To supplement the description of the present invention and to provide general background relating thereto, Applicant incorporates by reference in their entirety the following issued U.S. patents for further clarification of the present invention: U.S. Pat. No. 5,964,222 entitled "Hypoxic Tent System" filed Dec. 3, 1997; U.S. Pat. No. 5,924,419 entitled "Apparatus for Passive Hypoxic Training and Therapy" filed Feb. 8, 1997; U.S. Pat. No. 5,850,833 entitled "Apparatus for Hypoxic Training and Therapy" filed May 22, 1995; U.S. Pat. No. 5,799,652 entitled "Hypoxic Room System and Equipment for Hypoxic Training and Therapy at Standard Atmospheric Pressure", filed Jul. 21, 1995; and U.S. Pat. No. 5,467,764 entitled "Hypobaric Sleeping Chamber" filed May 13, 1993.

It is to be understood, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

At least some of the above-identified components of the present invention will now be described in further detail. The essential features of the present invention are set forth above in the Summary of the Invention and are depicted generally in FIGS. 3 10. In one embodiment, the Colorado Mountain Room 50 includes an enclosed space 54 where the altitude or carbon dioxide concentration is controlled.

Computerized Controller 58

The computerized controller 58 allows a user to choose one of the following operational modes: high altitude, low altitude, or high $CO_2$. Once the operational mode is selected, the computer may require the user to enter the actual altitude of the CMR. Since actual altitude affects how the desired altitude is simulated, in one embodiment, the user must enter the actual altitude where the equipment is installed. Note that at sea level (e.g. Los Angeles) a 13.4% oxygen concentration simulates 12,500 feet. But at 8,000 feet (e.g. Vail), a 13.4% oxygen concentration simulates 19,750 feet. Thus, for embodiments of the invention that use a relative amount of $O_2$ to simulate a desired altitude, an accurate determination of the actual altitude is important. In one embodiment the controller utilizes a barometric pressure transducer to measure atmospheric pressure, and thus determine the users "physiological" or simulated altitude. This reading may be compared to the user's input of true elevation above sea level. This feature makes user error less likely and serves as a safety feature keeping oxygen levels appropriate to the elevation above sea level. In addition it serves as a mechanism to disallow improper use by the user (i.e. entering false low altitude readings to increase the upper limit of altitude simulation of the device.). Accordingly, the computerized controller 58 compares the user input altitude of the site with the 'pressure altitude' derived from the ambient pressure sensor. If the two altitudes are significantly different, the computerized controller 58 requires the user to enter the actual altitude again and warns that the ambient pressure sensor may be faulty.

After comparing the user-entered altitude with the pressure altitude at the site, the computerized controller 58 adjusts the oxygen sensor to the known ambient oxygen percentage of 20.94%. The Colorado Mountain Room 50 must be at the ambient oxygen partial pressure (open to the external environment) during this procedure. In one embodiment of the invention, sensors are calibrated to a known oxygen level provided by another device such as an oxygen analyzer, allowing the user to recalibrate the sensors without opening the Colorado Mountain Room to the external environment and thus losing the high or low oxygen level already attained by the device.

If the present invention is in the high altitude mode or the low altitude mode, the computerized controller 58 permits the user to select a simulated altitude for the Colorado Mountain Room 50 that is, respectively, higher or lower than the actual altitude. In one embodiment, the simulated altitude can be any value between sea level and 12,500 feet. The simulated altitude must be above the actual altitude when the present invention is in high altitude mode or below the actual altitude when the present invention is in low altitude mode.

If the CMR 50 is in the High Altitude mode, the computerized controller 58 tests to see whether the Simulated Altitude is more than 250 ft above the Desired Altitude. If the answer is no, the $O_2$ concentrator is activated. If the answer is yes, the computerized controller 58 tests to see whether the Simulated Altitude is more than 750 ft above the Desired Altitude. If the answer is no, the Fan Gate is deactivated. If the answer is yes, the Fan Gate is activated and the computerized controller 58 tests to see whether the Simulated Altitude is greater than 16500 feet. If the Simulated Altitude is greater than 16500 ft, the Alarm is activated as a safety feature. The computerized controller 58 continues to monitor the Simulated Altitude. It activates and deactivates the Oxygen Concentrator and the Fan Gate as needed to keep the Simulated Altitude within 250 ft of the Desired Altitude. In this way, the computerized controller 58 maintains the Colorado Mountain Room 50 near the simulated altitude.

If the system is in the Low Altitude mode, the computerized controller 58 tests to see whether the Simulated Altitude is greater than the Desired Altitude. If the answer is no, the Oxygen Concentrator is deactivated. If the answer is yes, the Oxygen Concentrator is activated and the computerized controller 58 tests to see whether the Simulated Altitude is greater than 16500 feet. If the answer is yes, the Alarm is activated as a safety feature. The computerized controller continues to monitor the Simulated Altitude. It activates and deactivates the Oxygen Concentrator as needed to keep the Simulated Altitude within 250 ft of the Desired Altitude.

If the system is in either the Low Altitude or the High Altitude mode, the computerized controller 58 checks the $CO_2$ concentration. If the $CO_2$ concentration is greater than 1000 ppm, the computerized controller 58 activates the $CO_2$ scrubber. If the $CO_2$ concentration is greater than 7000 ppm, the computerized controller 58 activates the Fan Gate and the Alarm. The Fan Gate ventilates the CMR 50 to decrease the $CO_2$ concentration. The Alarm warns the user that the $CO_2$ concentration is out of range. If the $CO_2$ concentration is less than or equal to 1000 ppm, the computerized controller 58 deactivates the $CO_2$ Scrubber. The computerized controller 58 continues to monitor the $CO_2$ concentration. It activates and deactivates the $CO_2$ Scrubber and the Fan Gate to keep the $CO_2$ concentration in the CMR 50 below 7000 ppm.

If the system is in any of the three modes, the computerized controller checks the Temperature and the Pressure. If the Temperature is not in the range between 40 F. and 104 F., the computerized controller 58 activates the Alarm as a warning. If the Pressure is not in the range between 600 mb and 1100 mb, the computerized controller activates the Alarm as a warning.

If the present invention is in the High $CO_2$ mode, the computerized controller 58 checks to see whether the Simulated Altitude is greater than 6,000–9,000 feet. If the answer is yes, the Fan Gate is activated and the computerized controller 58 checks to see whether the Simulated Altitude is greater than 12,500 feet. If the answer is yes, the computerized controller 58 activates the Alarm as a safety feature. If the Simulated Altitude is below 6,000 ft, the computerized controller 58 deactivates the Fan Gate. The computerized controller 58 continues to monitor the Simulated Altitude to assure that it does not exceed 12,500 feet.

When the CMR 50 is closed and occupied by one or more people, the $CO_2$ concentration will rise and the oxygen partial pressure will drop. The Permissible Exposure Limit (PEL) for $CO_2$ is 5,000 parts per million (OSHA) over an 8-hour interval. If the system is in the High $CO_2$ mode, the computerized controller 58 checks to see whether the $CO_2$ concentration is greater than 3250 ppm. If the answer is no, the $CO_2$ Scrubber is deactivated. If the answer is yes, the $CO_2$ scrubber is activated and the computerized controller 58 checks to see whether the $CO_2$ concentration is greater than 5000–10,000 ppm. If the answer is yes, the Computerized Controller activates the Fan Gate and the Alarm. The Computerized Controller continues to monitor the $CO_2$ concentration and maintain it near 3250 ppm for safe and restful sleep.

Figure 14:
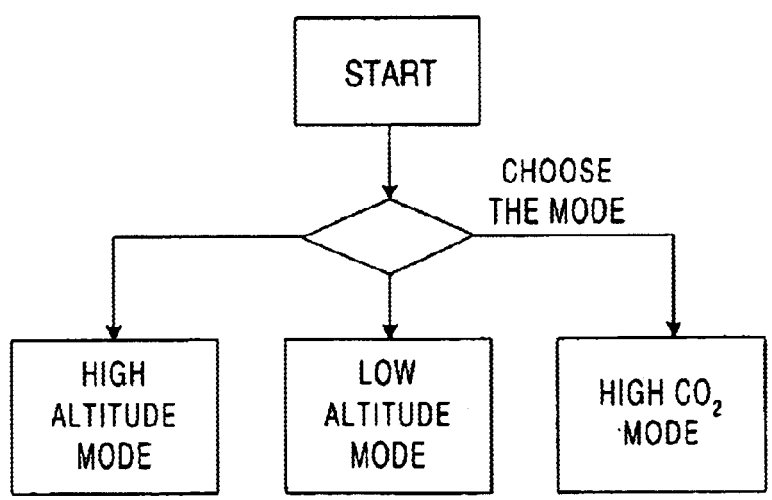
FIG. 14 shows a high level flowchart of the steps performed by the controller in determining (in response to a user's input) the altitude simulation technique (i.e., mode) which the controller is to use in controlling the CMR.
Figure 15:
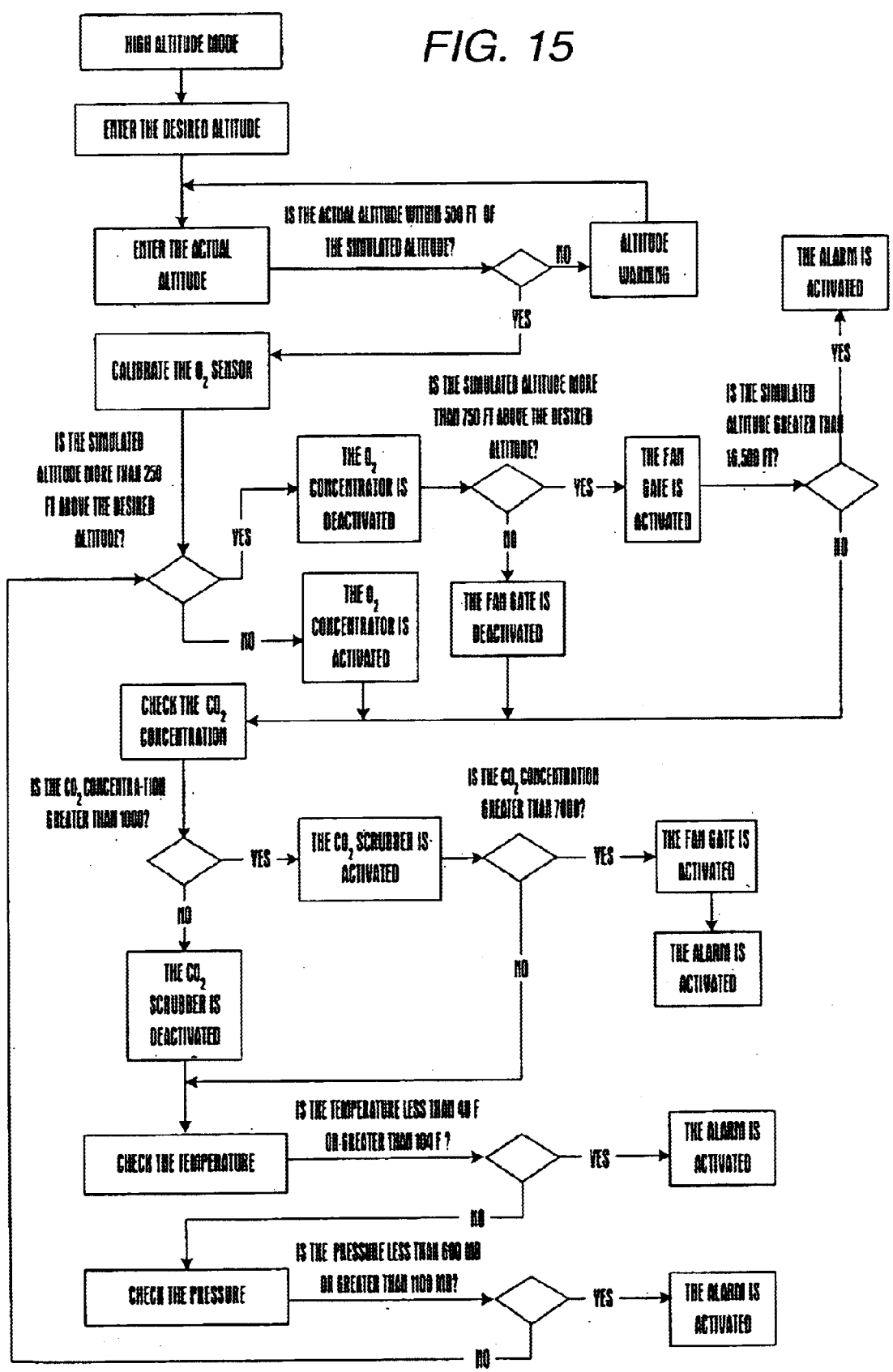
FIG. 15 shows a high level flowchart of the steps performed by the controller when the controller is performing a high altitude (i.e., higher than the actual altitude) simulation via a reduction in oxygen and an increase in a gas such as nitrogen, helium, or other gas that is typically nonreactive with a user.
Figure 16:
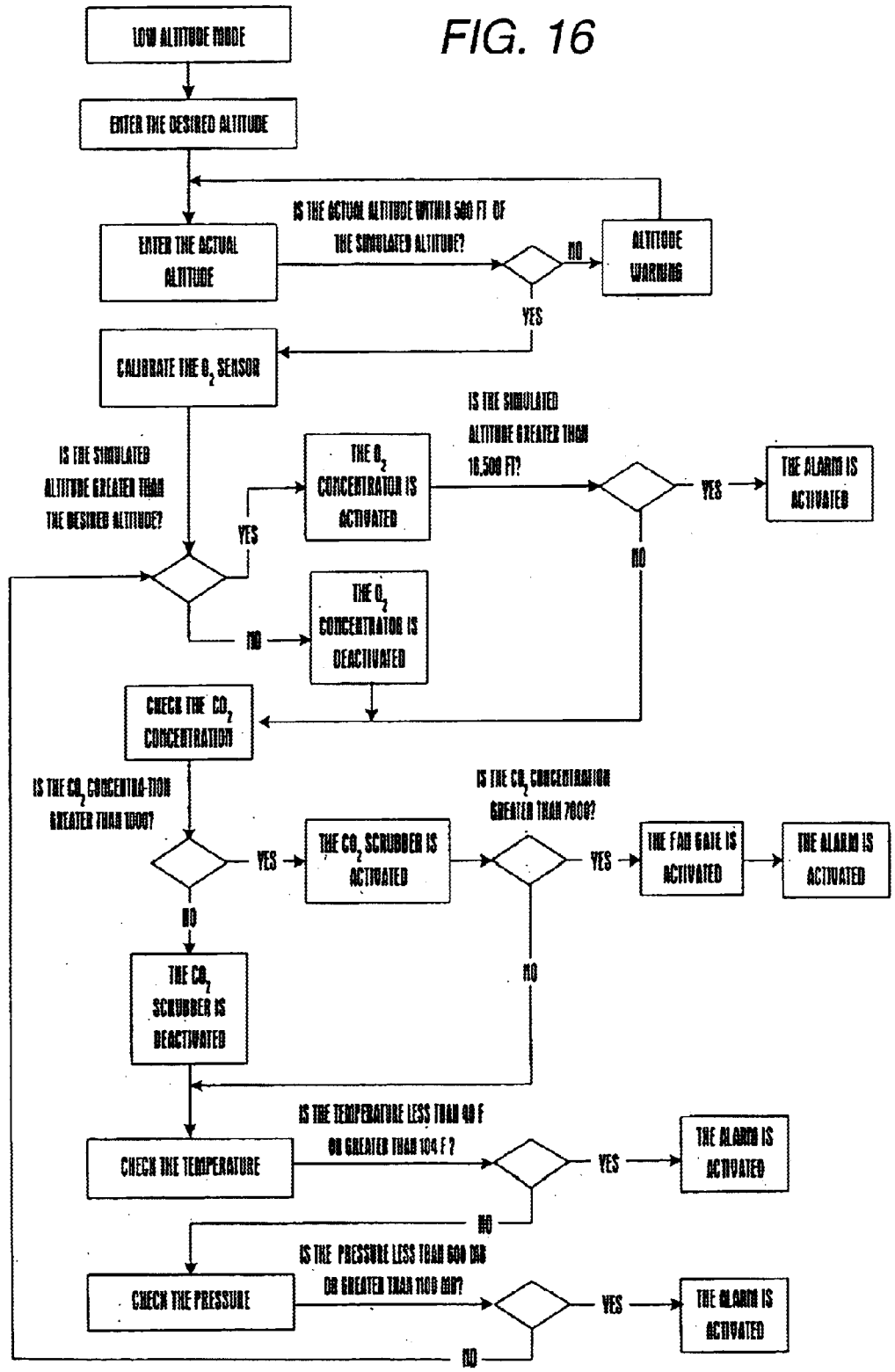
FIG. 16 shows a high level flowchart of the steps performed by the controller when the controller is performing a low altitude (i.e., lower than the actual altitude) simulation via an increase in oxygen within the CMR.
Figure 17:
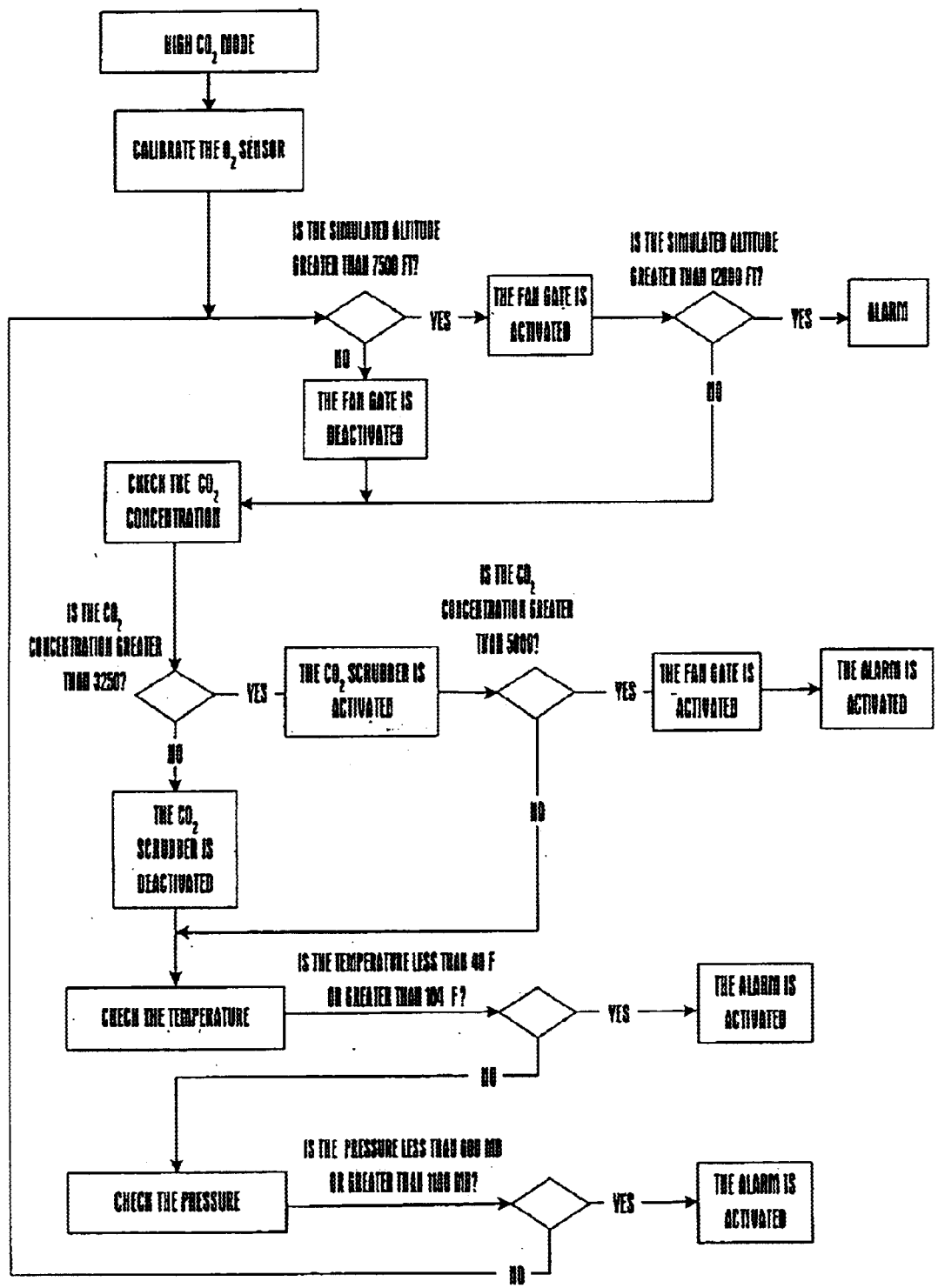
FIG. 17 shows a high level flowchart of the steps performed by the controller when the controller is performing a high altitude (i.e., higher than the actual altitude) simulation via a reduction in oxygen and an increase in $CO_2$.

Note that FIGS. 14 through 17 show the high level steps performed by the controller 58 in controlling the simulated altitude of the CMR 50. In particular, FIG. 14 shows a high level flowchart of the steps performed by the controller in determining (in response to a user's input) the altitude simulation technique (i.e., mode) that the controller is to use in controlling the CMR. Additionally, FIG. 15 shows a high level flowchart of the steps performed by the controller when the controller is performing a high altitude (i.e., higher than the actual altitude) simulation via a reduction in oxygen and/or an increase in a gas such as nitrogen, helium, or other gas that is typically non-reactive with a user. Additionally, FIG. 16 shows a high level flowchart of the steps performed by the controller when the controller is performing a low altitude (i.e., lower than the actual altitude) simulation via an increase in oxygen within the CMR. Finally, FIG. 17 shows a high level flowchart of the steps performed by the controller when the controller is performing a high altitude (i.e., higher than the actual altitude) simulation via a reduction in oxygen and an increase in $CO_2$.

Oxygen Concentrator

The oxygen concentrator is a device that provides a flow of oxygen rich air and a separate flow of oxygen depleted air. Oxygen concentrators are available commercially (Nidek, Incorporated, Sequal, Incorporated). Oxygen concentrators separate oxygen from ambient air by, e.g., passing the air through a molecular sieve at high pressure or by a technique of pressure swing absorption. The oxygen concentrator draws air either from the interior of the CMR, or in another embodiment from the exterior of the CMR. In the high altitude mode (i.e., low oxygen mode), the oxygen concentrator removes oxygen from the Colorado Mountain Room 50 or alternatively introduces nitrogen to the Colorado Mountain Room. In the low altitude (i.e., high oxygen) mode, the oxygen concentrator supplies oxygen to the Colorado Mountain Room 50 or alternatively removes nitrogen.

As a mechanical safety device, in at least one embodiment, the oxygen concentrator is equipped with a flow restrictor that prevents the simulated altitude from rising above 15,000 feet. The size of the flow restrictor is determined by the size of the Colorado Mountain Room 50, its actual altitude, the flow rate of the oxygen concentrator (s), and the number of people expected to use it at a time and the air infiltration rate.

One or more $O_2$ concentrators are connected to the computerized controller 58. The number and size of oxygen concentrators required for an embodiment of the invention is determined by the size of the Colorado Mountain Room 50, its actual altitude, the air infiltration rate and the number of people expected to use it at a time. The computerized controller 58 activates the oxygen concentrator(s), based on the oxygen and carbon dioxide concentrations.

Carbon Dioxide Scrubber

In one embodiment, the $CO_2$ scrubber is a device that uses a mixture of Calcium and Sodium Hydroxide (NaOh) pellets to remove $CO_2$ from the air. When exposed to an acidic gas like $CO_2$, a strong, exothermic (heat producing) reaction takes place, which gives off water vapor and binds the $CO_2$ by forming Calcium Carbonate. Water is an important part of the reaction that takes place to bind the $CO_2$ in that first, the gaseous $CO_2$ reacts with water to form carbonic acid ($H_2CO_3$). Then, the NaOH reacts with the carbonic acid to produce $Na_2CO_2$ and $H_2O$. The $Na_2CO_2$ reacts with the $Ca(OH)_2$ which has been disassociated into Calcium and Hydroxide Ions. (Ca++ and OH−) to produce $CaCO_2$ (calcium carbonate, otherwise known as limestone.) The $CO_2$ remains in a stable state. There is a net production of three $H_2O$ molecules for every molecule of $CO_2$ that is removed.

In one embodiment, the $CO_2$ scrubber is a commercial air cleaner (DustFree, Inc., Royse City, Tex., USA—Model 250), modified to accept the $CO_2$ scrubbing pellets. The scrubbing pellets are commercially available (Northwood Designs, Inc., Antwerp, N.Y., USA) in 44-pound kegs. The pellets are scooped into polyester sacks. The polyester sacks hold the pellets and trap the dust emitted by them. In one embodiment, the $CO_2$ scrubber requires four sacks, one on each side of the $CO_2$ scrubber. Ambient air in the CMR is drawn through the sacks by a fan and then the $CO_2$ cleansed air is returned to the Colorado Mountain Room 50. The pellets inside the sacks remove $CO_2$ from the air as it passes over them.

One or more $CO_2$ scrubbers are connected to the computerized controller 58. The number and size of $CO_2$ scrubbers required for an application is determined by the size of the Colorado Mountain Room 50, the number of people or animals expected to use it at a time and their activity level. The computerized controller 58 activates the scrubber(s), based on the carbon dioxide concentration as described hereinabove.

Ventilation Mechanism

In one embodiment, the ventilation mechanism includes a vent, fan, blower, gate, or a moveable disc, and a solenoid switch encased in an enclosure. The ventilation fan or other such mechanism is installed through the wall of the Colorado Mountain Room 50. The solenoid switch acts to either open or close an air passage into the room. When the air passage into the CMR is open, the ventilation fan engages to push ambient exterior air into the Colorado Mountain Room 50.

One or more ventilation fans may be connected to the computerized controller 58. The computerized controller 58 activates the ventilation fans, based on the oxygen partial pressure and the $CO_2$ concentration in the room. The ventilation fan is a safety device that prevents the altitude in the room from rising above 15,000 feet and keeps the $CO_2$ concentration below 7,000 parts per million. In one embodiment of the invention, the oxygen concentrator runs constantly. The computerized controller activates the fan when desired altitude is exceeded. The fan brings in outside air thus limiting the simulated altitude to the desired altitude. In addition this embodiment maximizes ventilation through the enclosed space.

Oxygen Sensor

In one embodiment, the oxygen sensor detects oxygen in the air by means of a fuel cell detector that generates an electrical voltage proportional to the oxygen partial pressure. The oxygen sensor consists of a diffusion barrier, a sensing electrode made of a noble metal such as gold or platinum, and a working electrode (anode) made of lead or zinc immersed in a basic electrolyte. Oxygen, which diffuses into the sensor, undergoes an electrochemical reaction that converts the oxygen into lead-oxide ($PbO_2$). This electrochemical reaction also produces a net electrical voltage.

In one embodiment, the oxygen sensor is commercially available (Figaro USA, Incorporated Glenview, Ill., USA). The sensor produces a voltage in the range between 0 –50 mv. This corresponds to an oxygen partial pressure between 0 and 1013 mb at sea level.

The present invention improves the accuracy of the oxygen sensor by a factor of 55 (square root of the number of samples) by averaging approximately 3,000 samples each 30-seconds. The drift of the oxygen sensor with changing ambient atmospheric pressure was removed by means of measuring the ambient atmospheric pressure and compensating for it. In at least some embodiments of the invention, the drift of the oxygen sensor with temperature was found to be insignificant in the temperature range between 15 C. and 27 C.

Figure 11:
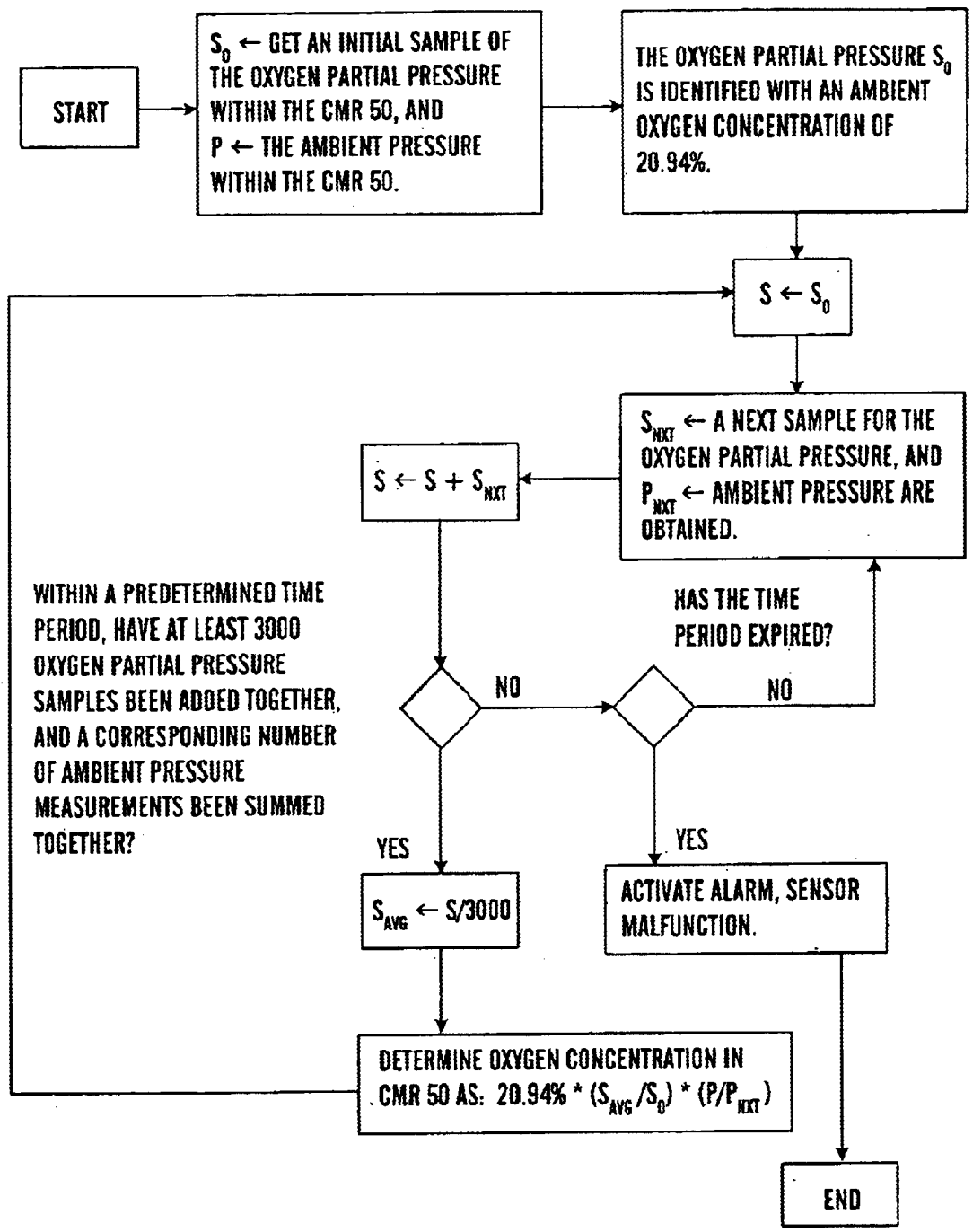
FIG. 11 is a flowchart illustrating the steps for the calibration and compensation for drift in the oxygen sensors.

FIG. 11 shows a flowchart for the calibration, averaging, and pressure compensation of the oxygen sensor. When the computerized controller is started, samples of the oxygen partial pressure ($S_O$) and the ambient pressure (P) are taken. Next, the percent oxygen is defined to be 20.94% at the initial ambient pressure (P). Then, samples of $O_2$ and atmospheric pressure within CMR 50 are collected until a total of 3,000 are reached. When 3,000 samples are collected the $O_2$ is averaged ($S_{AVG}$), and subsequently an oxygen concentration for the CMR 50 is determined according to the following formula: $20.94\% * (S_{AVG}/S_O) * (P/P_{NXT})$. Note that the term $P/P_{NXT}$ is an important aspect of the present invention in that this term compensates for CMR 50 ambient pressure variations to more precisely determine oxygen concentration levels therein. Additionally, note that for one skilled in the art, numerous other variations in the flowchart of FIG. 11 will become readily apparent, such as: 1000 samples per minute, 3000 samples in 30 seconds, and 10,000 samples per second.

The oxygen sensor is connected to the computerized controller 58 and the oxygen percentage is displayed on the visual display panel. The oxygen partial pressure, as derived from the oxygen sensor voltage, is used to determine the simulated altitude of the Colorado Mountain Room 50 regardless of the mode of operation.

$CO_2$ Sensor

In one embodiment, the $CO_2$ sensor detects carbon dioxide in the air of the CMR by means of an active infrared sensing system that generates a voltage proportional to the concentration of $CO_2$. The $CO_2$ sensor is available commercially (Telaire, Incorporated, Goleta, Calif., USA—Model 8001). The infrared $CO_2$ sensor includes of an infrared source (emitting broadband radiation, including the wavelength absorbed by $CO_2$) and an infrared detector that are separated by a gas cell. Absorption increases with: (a) increasing gas concentration, and (b) increasing optical path length between the detector and the source. Knowing the dependence of absorption on the $CO_2$ concentration for a given path length, the sensor measures the $CO_2$ concentration, based on the reduction in infrared light intensity measured by the detector.

Outside ambient concentrations of $CO_2$ tend to be in the range between 370 and 425 parts per million. Heavily industrialized or polluted areas may have periodic $CO_2$ concentration peaks that can be as high as 800 ppmv in the outside air. The concentration of $CO_2$ in exhaled breath is typically around 3.8% (38,000 ppmv). Indoor concentrations of $CO_2$ in occupied spaces typically range between 500 ppmv and 2,000 ppmv.

Various organizations have established recommended levels for $CO_2$ concentrations in indoor spaces. The American Society of Heating, Refrigeration, and Air Conditioning Engineers (ASHRAE) recommend that the indoor $CO_2$ concentration not exceed 1,000 ppmv. The Occupational Safety and Health Administration (OSHA) requires that the $CO_2$ concentration not exceed 5,000 ppmv over an 8-hour workday.

The $CO_2$ sensor of the present invention is connected to the computerized controller 58 and the $CO_2$ concentration is displayed on the visual display panel. The computerized controller 58 activates the $CO_2$ scrubber and the ventilation fan to maintain the $CO_2$ concentration at safe levels in the Colorado Mountain Room 50.

Temperature Sensor

In at least one embodiment of the present invention, the temperature sensor detects the temperature of the air by means of a type J or a type T thermocouple as one skilled in the art will understand. The thermocouple terminates in a stainless steel ring that is bolted to the housing of the computerized controller 58. The temperature sensor is available commercially (Thermo-Electron, Incorporated, Waltham, Mass., USA Type J or T). The temperature sensor is operatively connected to the computerized controller 58 and the temperature is displayed on the visual display panel. The computerized controller 58 activates the ventilation fan and the audible alarm, if the temperature in the Colorado Mountain Room 50 becomes colder than 40 F. or warmer than 104 F. This is done to assure that the Colorado Mountain Room 50 is not used under conditions where the oxygen partial pressure (simulated altitude) is not accurately measured.

Ambient Pressure Sensor

In at least one embodiment of the invention, the ambient pressure sensor detects the atmospheric pressure by means of a pressure transducer. It produces a 0.1–5.1 volt signal over a pressure range of 600–1100 mb. The ambient pressure sensor is available commercially (Setra, Systems, Inc., Boxborough, Mass., USA—Model 276). The pressure transducer contains two closely spaced, parallel, electrically isolated metallic surfaces, one of which is a diaphragm capable of slight flexing under applied pressure. The diaphragm is constructed of a low-hysteresis material. These firmly secured surfaces (or plates) are mounted so that a slight mechanical flexing of the assembly, caused by a minute change in applied pressure, alters the gap between them (creating, in effect, a variable capacitor). The resulting change in capacitance is detected and converted to a proportional analog signal.

The ambient pressure sensor is connected to the computerized controller 58 and the ambient pressure is displayed on the visual display panel. The computerized controller 58 corrects the oxygen partial pressure measured by the oxygen sensor for variations in ambient pressure. Accordingly, it is an aspect of at least some embodiments of the present invention to compensate for natural fluctuations in the atmospheric pressure when simulating a desired altitude in the CMR 50. Moreover, the controller 58 activates the ventilation fan and the audible alarm, if the ambient oxygen partial pressure in the Colorado Mountain Room 50 becomes smaller than 600 mb or larger than 1100 mb. This is done to assure that the Colorado Mountain Room 50 is not used under conditions where the oxygen partial pressure (simulated altitude) is not accurately measured.

Colorado Mountain Room 50 in Operation

The user enters the desired altitude (i.e. the desired simulated altitude.) This is digitally displayed on the controller 58. A magnetic gate seals one or more penetrations into the sealed environment when power is supplied to the gate. A solenoid actuator or a small motor holds the gate closed when power is on and opens the gate when power is off.

One or more fans located within the port are connected to the controller 58 in some embodiments. The controller 58 turns the fans off and on based on oxygen and carbon dioxide levels. One or more $O_2$ concentrators are connected to the controller 58. The controller 58 turns the oxygen concentrators off or on based on oxygen and carbon dioxide levels. An oxygen concentrator is a device that provides a flow of oxygen rich air and a separate flow of oxygen depleted air. The oxygen concentrator draws air either from the interior of the enclosed space, or in another embodiment from the exterior of the enclosed space.

One or more $CO_2$ scrubbers are connected to the controller 58. The controller 58 turns the scrubber off or on based on oxygen and carbon dioxide levels. The controller 58 can also increase flow through the $CO_2$ scrubber by a rheostat or similar device. A $CO_2$ scrubber is a device that uses $CO_2$ absorbent materials to remove $CO_2$ from the air.

One or more alarms are connected to the controller 58. The controller 58 turns the alarm off or on based on oxygen and carbon dioxide levels. The controller 58 calculates the simulated altitude based on the real altitude setting and the oxygen level in the room (as reported by the oxygen sensor.) The controller 58 also calculates the oxygen level required to simulate the desired altitude based on the real altitude setting and the desired altitude input by the user.

In alternative embodiments of the invention, the following compounds may also be provided:

(i) An activated charcoal or carbon filter reduces odors.

(ii) Closed loop or split system air conditioning provides cooling.

(iii) A humidifier increases humidity.

(iv) A dehumidifier reduces humidity.

(v) A HEPA filter or similar device reduces allergens and air impurities.

(vi) Battery back up for oxygen sensor, CO2 sensor, and fan.

The controller 58 displays: the desired altitude in feet above sea level or the required oxygen level for the desired altitude; the actual oxygen level measured by each sensor as a percentage of air or as a calculation of simulated altitude in feet above sea level; the actual $CO_2$ level measured by the sensor; and the input altitude provided by a user.

Predictive Computer Model

The Colorado Mountain Room is an enclosed space where the altitude or carbon dioxide concentration is controlled. A mathematical model was created to predict the altitude, the concentration of oxygen, and the concentration of $CO_2$ in the room as a function of time. The mathematical model is a mass-balance simulation over time. It requires the following information to establish its initial conditions:

(1) The length, width, and height of the Colorado Mountain Room.

(2) The altitude of the site.

(3) The number of people expected to occupy the Colorado Mountain Room.

(4) The oxygen removal or supply rate of the oxygen concentrator.

(5) The number of oxygen concentrators to be used.

(6) The per-person heat generation rate. This determines the activity level in the Colorado Mountain Room. It is converted to the per-person oxygen consumption rate and carbon dioxide production rate.

(7) The initial oxygen concentration in the Colorado Mountain Room.

(8) The concentration of $CO_2$ in the ambient atmosphere.

(9) The initial $CO_2$ concentration in the Colorado Mountain Room.

(10) The airflow rate through the $CO_2$ scrubber.

(11) The efficiency (%) of the $CO_2$ scrubber at removing $CO_2$ from the air.

(12) The air exchange rate in the Colorado Mountain Room.

FIG. 1 shows an example of the data to be input into the predictive computer model for initialization. Accordingly, the Colorado Mountain Room Computer Model predicts the $CO_2$ concentration and the altitude in the Colorado Mountain Room as a function of time. FIG. 3 shows an example of these predictions using the initial conditions given in FIG. 1. Using the initialization data of FIG. 1, FIG. 3 shows the $CO_2$ concentration in the Colorado Mountain Room 50 rises to about 3,000 ppm in 12 hours and to 3,850 ppm in 48 hours. As well, the Colorado Mountain Room is predicted to reach a simulated altitude of about 14,000 ft. above sea level in 12 hours and about 15,000 ft. above sea level in 48 hours.

The Colorado Mountain Room Computer Model is used as follows:

1. It permits the designer of the Colorado Mountain Room to specify the appropriate system for each client and site.
2. It permits the user of the Colorado Mountain Room to choose an appropriate size for the enclosed space. Smaller rooms achieve a simulated altitude more quickly and require a smaller oxygen removal rate (fewer oxygen concentrators, and less cost).
3. By predicting the $CO_2$ concentration in the Colorado Mountain Room, the model assures that sufficient $CO_2$ scrubbing capacity will be available to keep the room safe and healthy.
4. By predicting the highest simulated altitude achieved in the Colorado Mountain Room, it assures that the room will not become unsafe for the occupants. And allows the designer to select appropriate flows for the oxygen concentrator(s).

The Colorado Mountain Room Computer Model computes selected variables, beginning at a time of zero and ending at a time of 7 days. The Model computes each selected variable in time steps until 7 days is reached. The time steps must be short enough to make the simulation accurate and long enough to make the simulation execute quickly. Our experience suggests that the time steps should be less than or equal to 15-minutes in duration.

The CMR Computer Model computes the following variables at each time step:

1. The volume of $O_2$ in the CMR at the beginning of the time step.
2. The volume of $O_2$ consumed by the occupants of the CMR during the time step.
3. The volume of $O_2$ removed from the CMR by the Oxygen Concentrator during the time step.
4. The volume of $O_2$ removed from the CMR by air exchange during the time step.
5. The volume of $O_2$ added to the CMR by air exchange during the time step.
6. The volume of $CO_2$ in the CMR at the beginning of the time step.
7. The volume of $CO_2$ produced by the occupants of the CMR during the time step.
8. The volume of $CO_2$ removed from the CMR by the $CO_2$ Scrubber during the time step.
9. The volume of $CO_2$ removed from the CMR by air exchange during the time step.
10. The volume of $CO_2$ added to the CMR by air exchange during the time step.
11. The concentration of $O_2$ inside the CMR at the end of the time step.
12. The Simulated Altitude inside the CMR at the end of the time step.
13. The concentration of $CO_2$ inside the CMR at the end of the time step.

Figure 18:
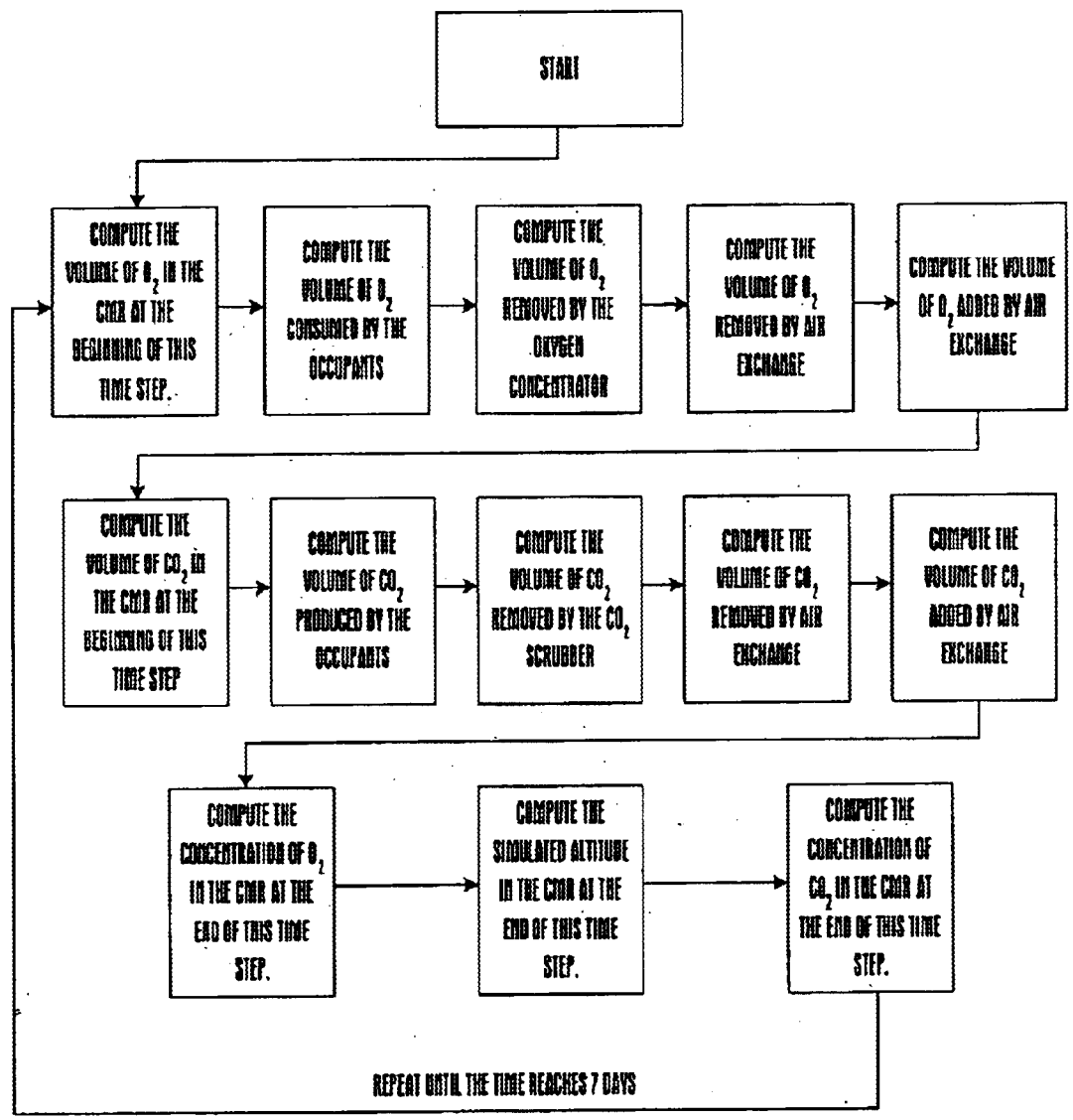
FIG. 18 shows a high level flowchart of the steps performed by the predictive computer model of the present invention.
Figure 20:
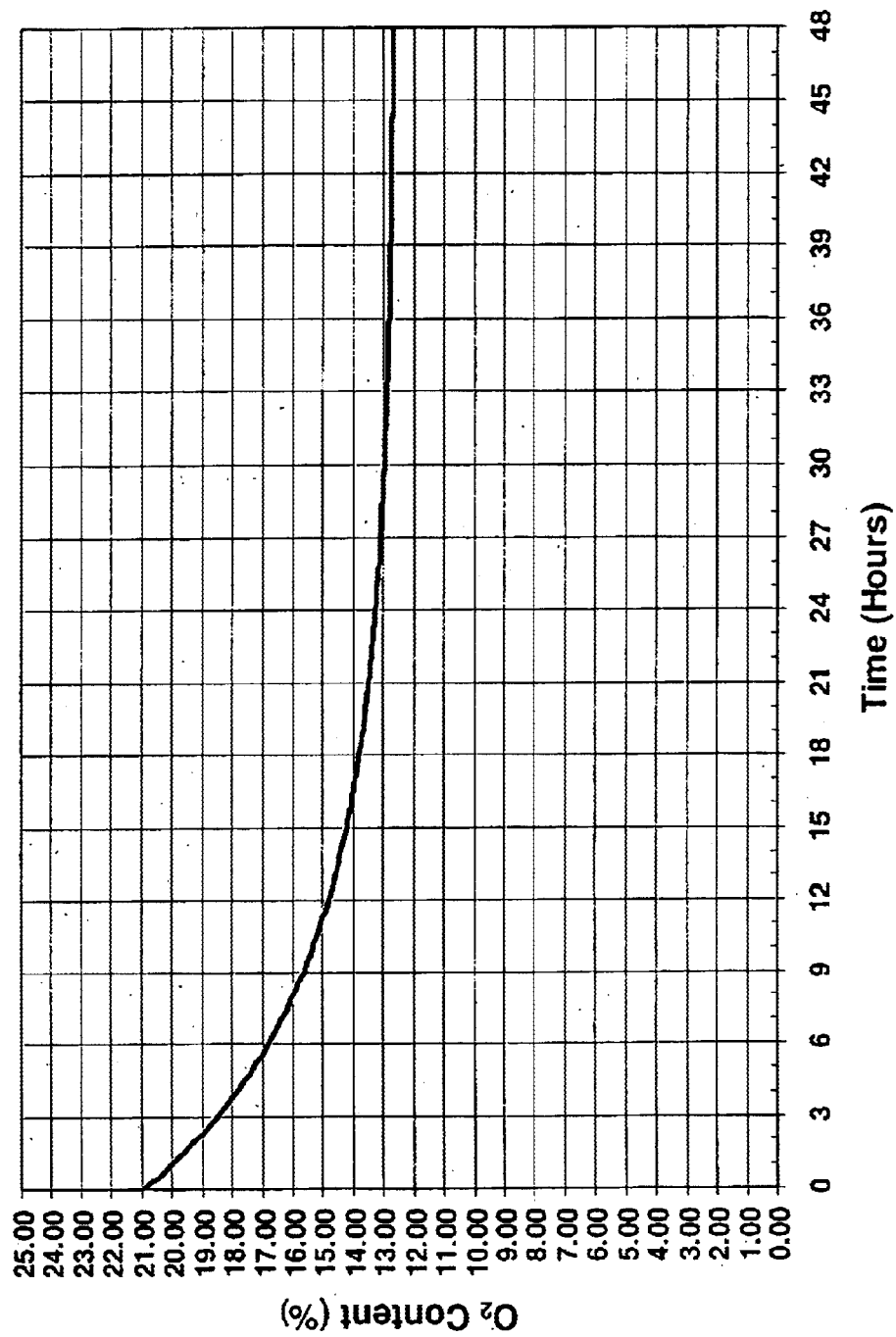
FIG. 20 shows a graph of the predicted percentage of oxygen from initial operation of the enclosure of the CMR 50 when the input data of FIG. 19 is input to the predictive computer model.
Figure 21:
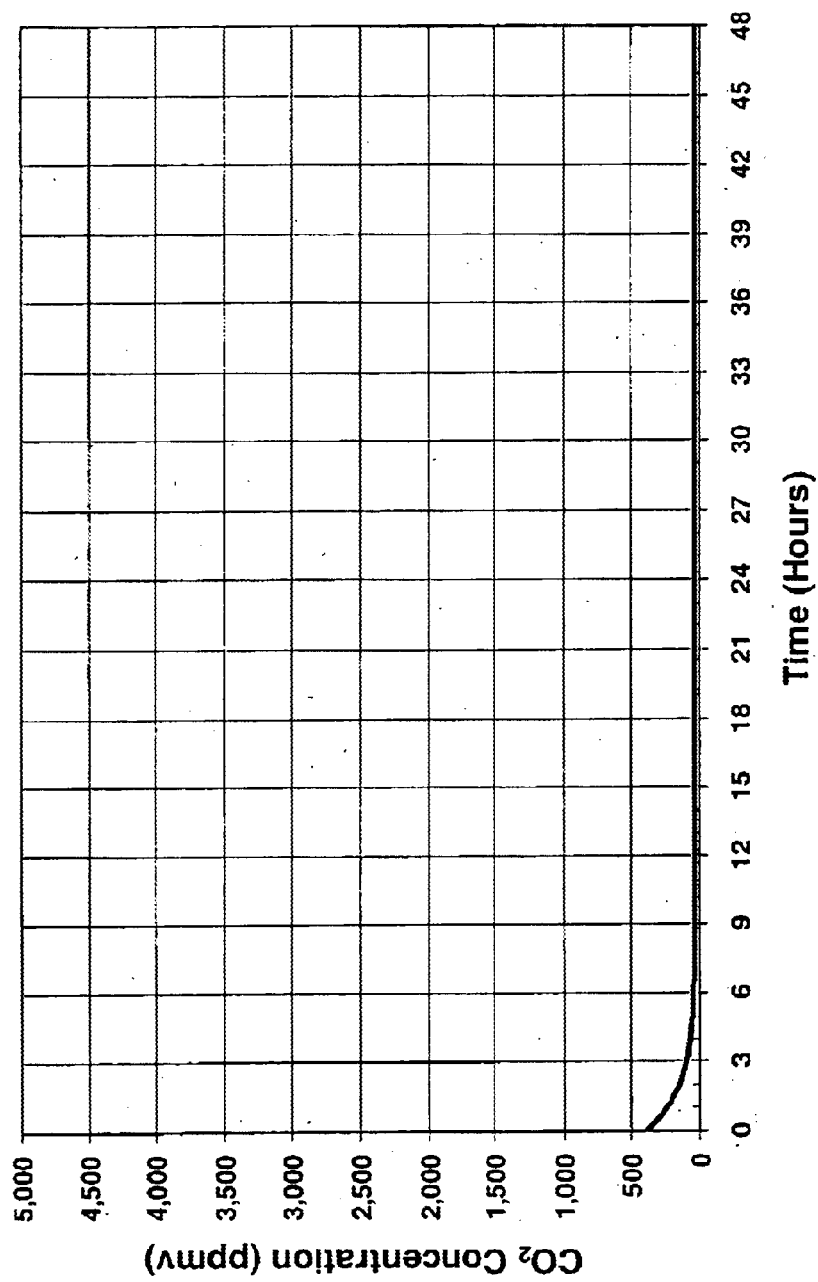
FIG. 21 shows a graph of the predicted concentration of $CO_2$ in the enclosure of the CMR 50 when the input data of FIG. 19 is input to the predictive computer model.
Figure 22:
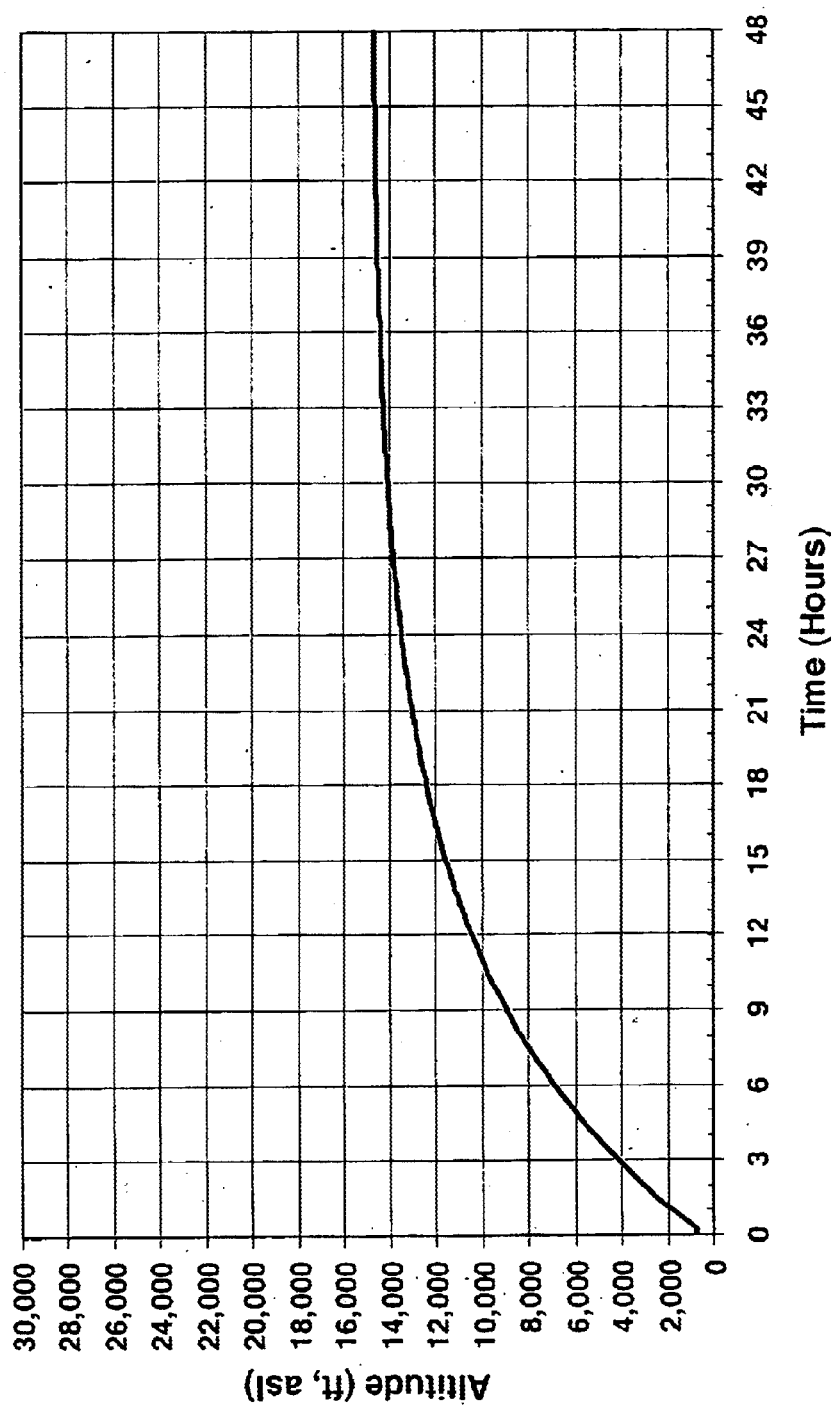
FIG. 22 shows a graph of the predicted simulated altitude in the enclosure of the CMR 50 when the input data of FIG. 19 is input to the predictive computer model.
Figure 23:
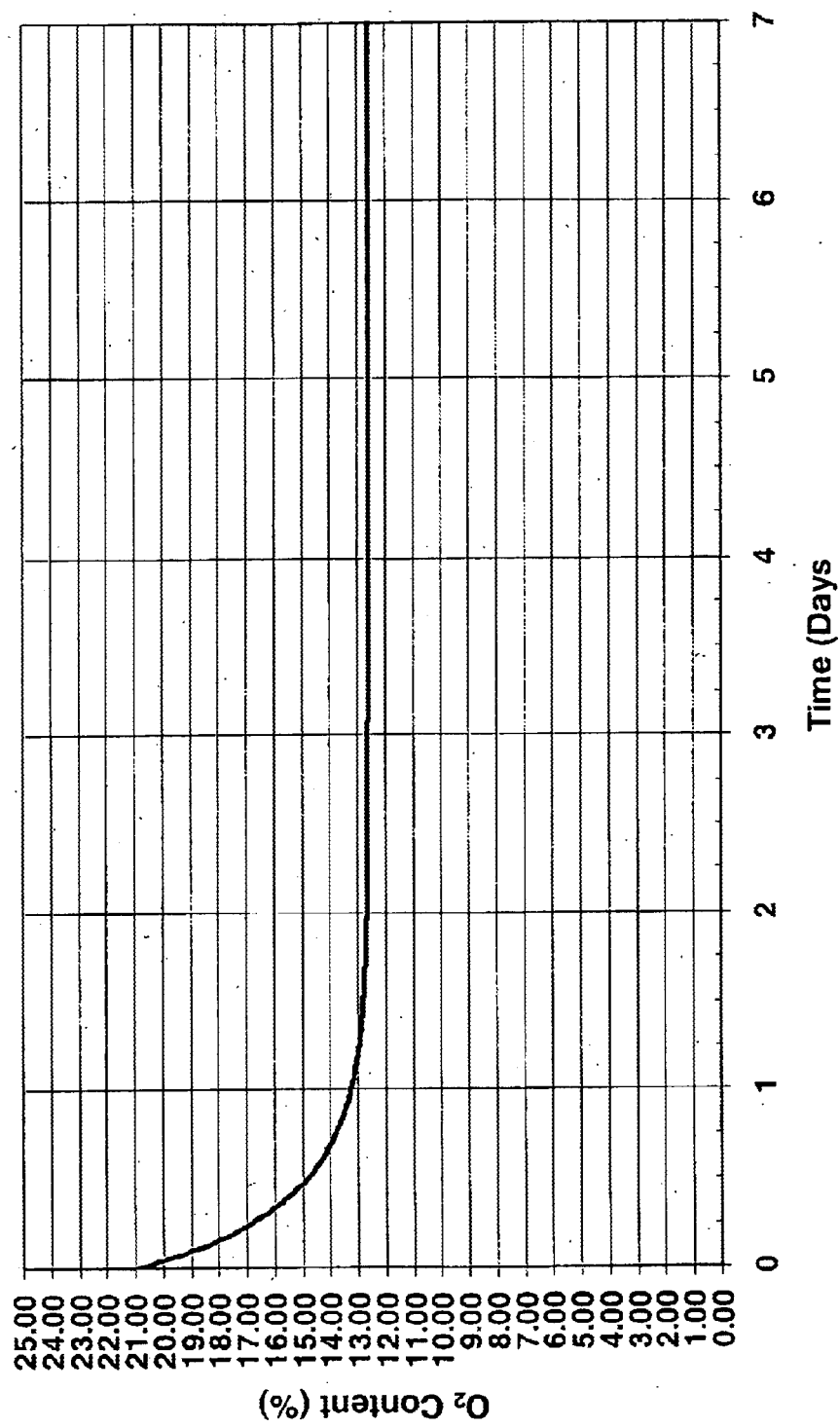
FIG. 23 shows a graph of the predicted oxygen consumption by user(s) in the enclosure of the CMR 50 when the input data of FIG. 19 is input to the predictive computer model.
Figure 24:
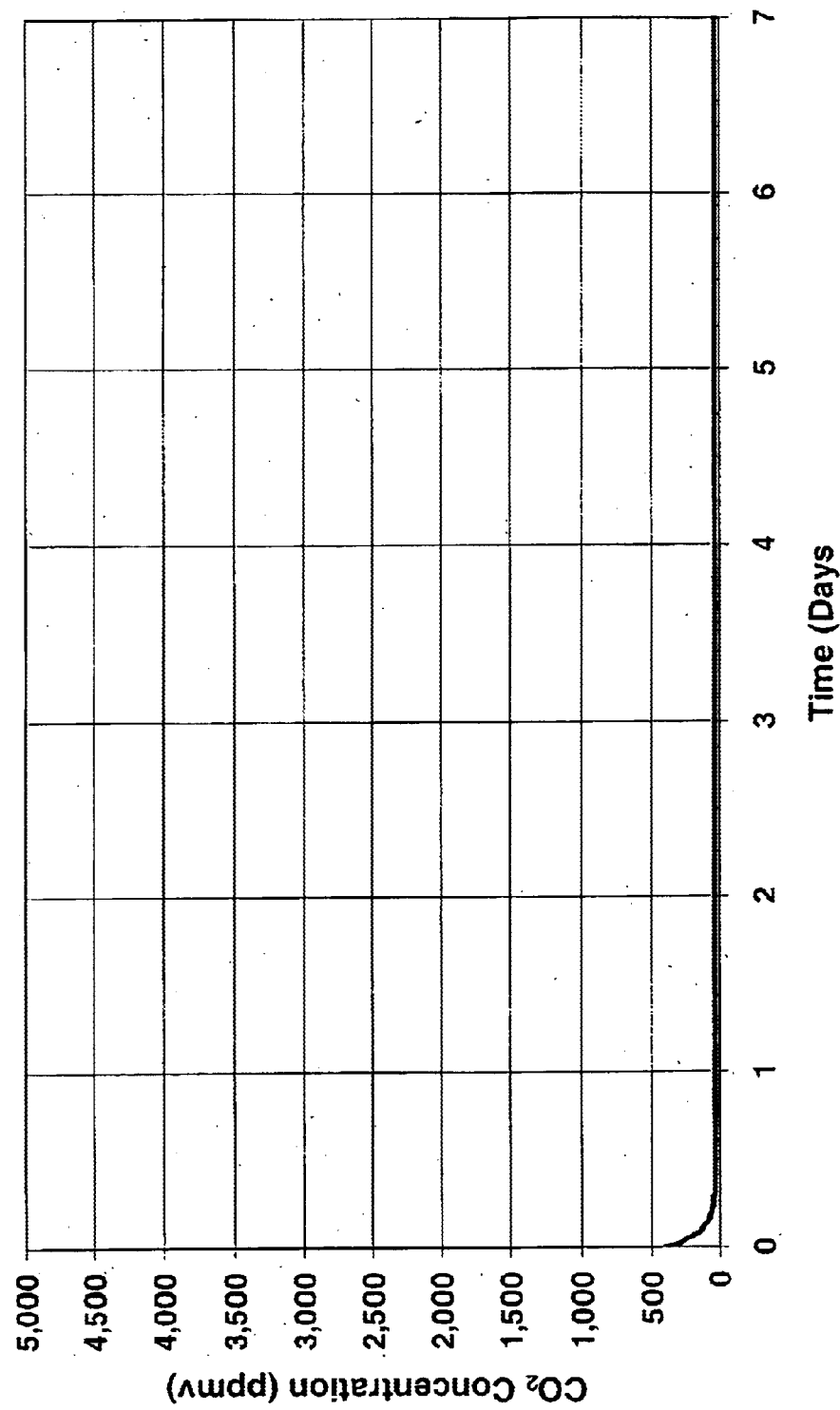
FIG. 24 shows a graph of the predicted concentration of $CO_2$ (in days) in the enclosure of the CMR 50 when the input data of FIG. 19 is input to the predictive computer model.
Figure 25:
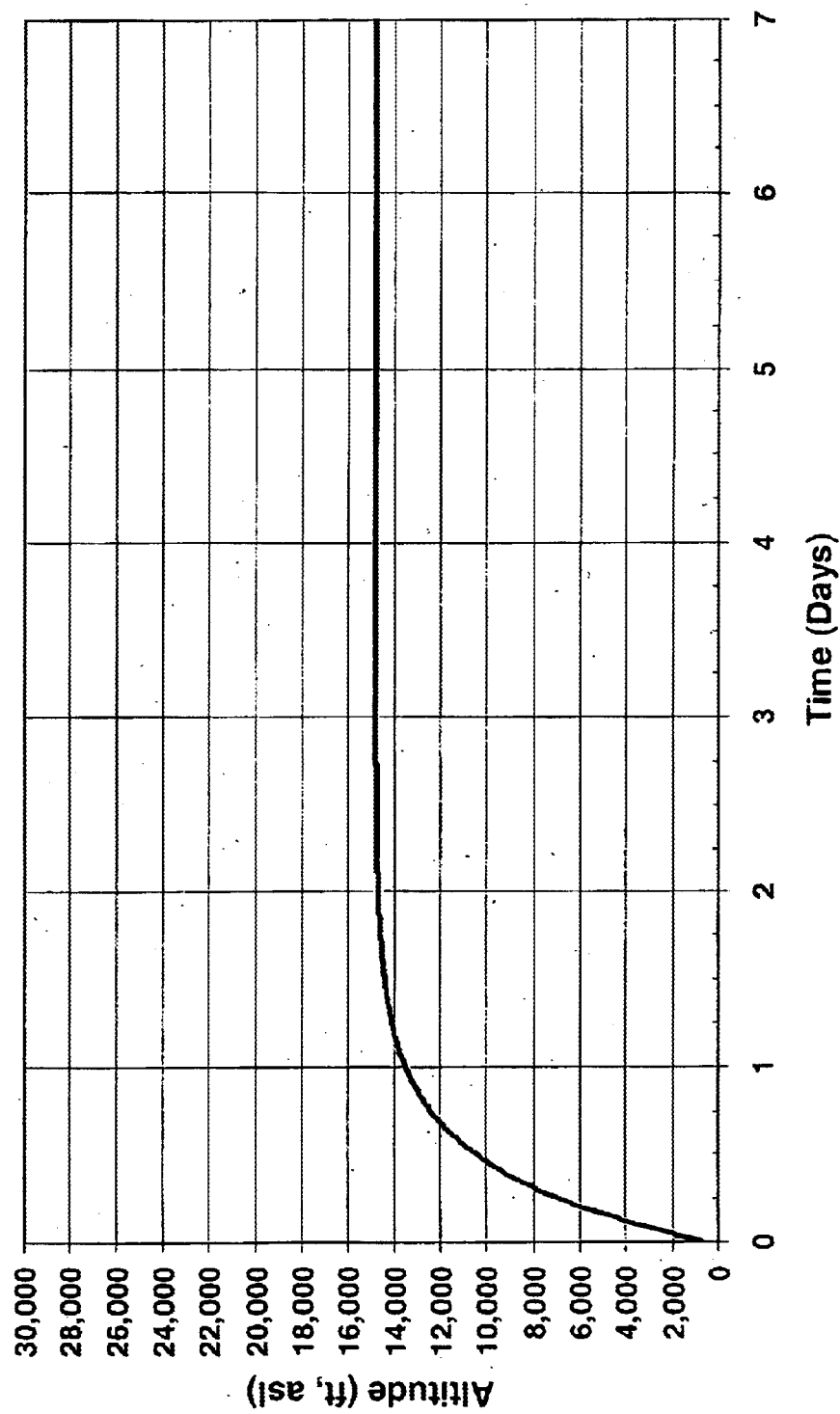
FIG. 25 shows a graph of the predicted simulated altitude (in days) in the enclosure of the CMR 50 when the input data of FIG. 19 is input to the predictive computer model.
Figure 26:
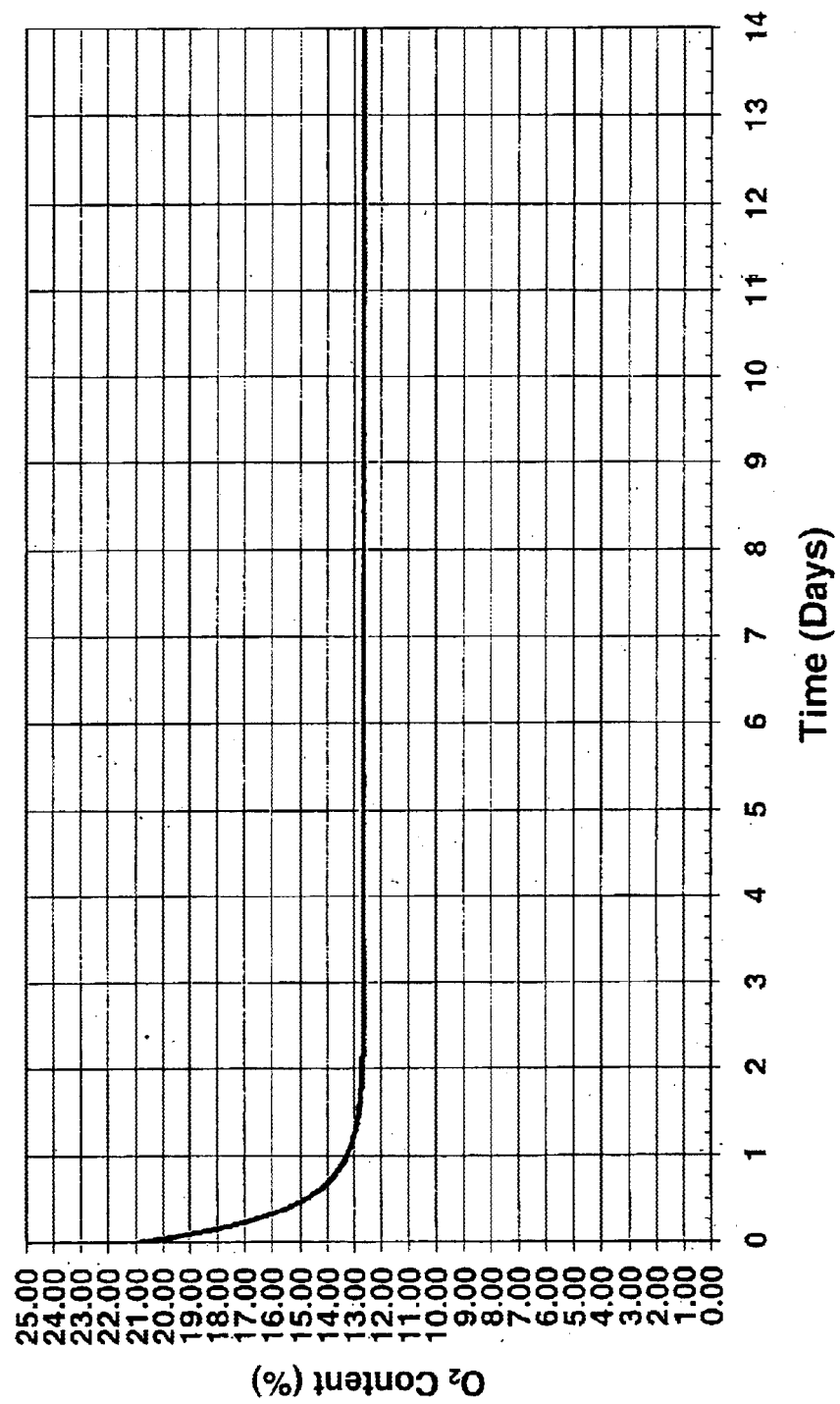
FIG. 26 shows a graph of the predicted percentage of oxygen (in days) in the enclosure of the CMR 50 when the input data of FIG. 19 is input to the predictive computer model.
Figure 27:
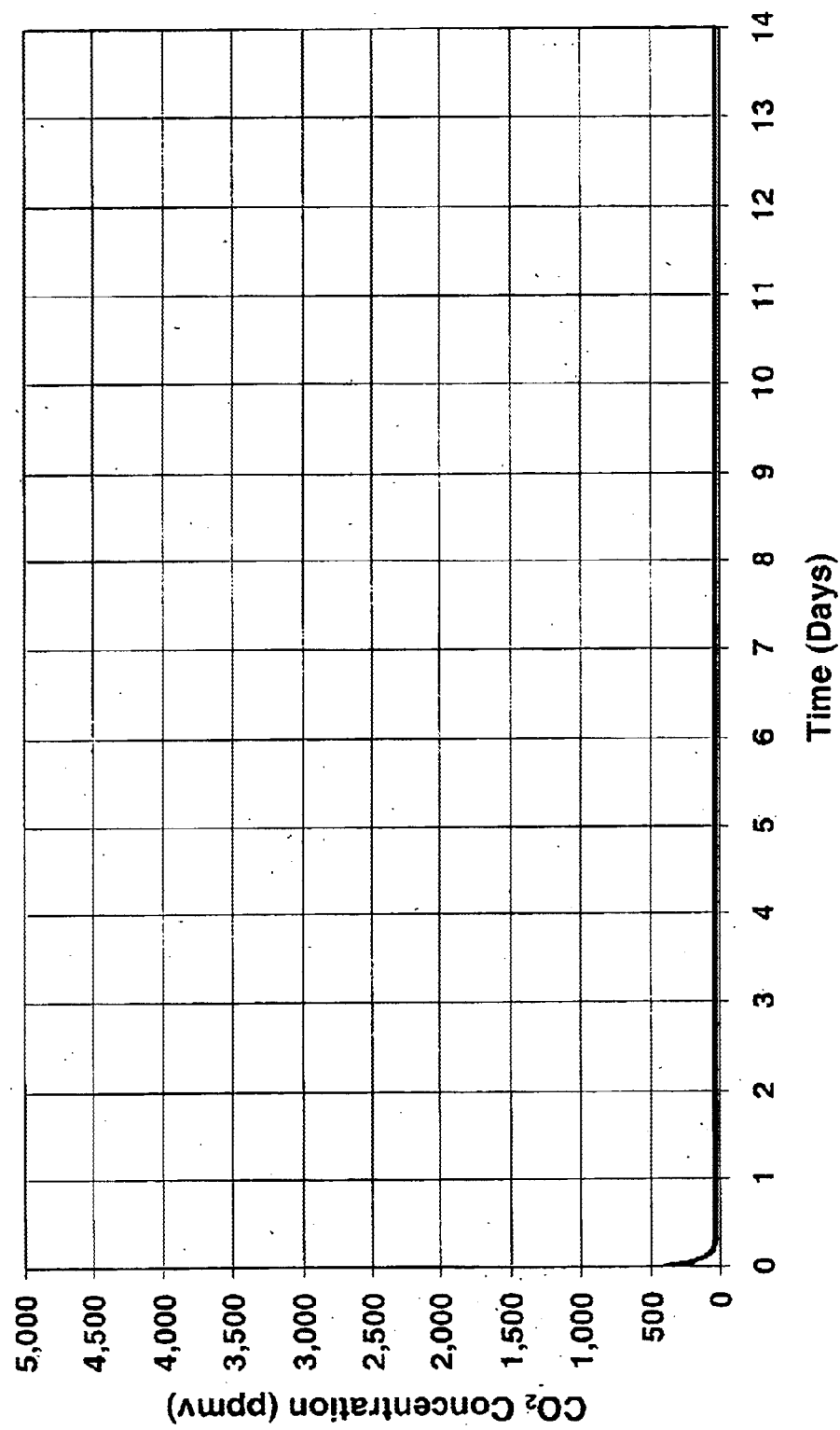
FIG. 27 shows another graph of the predicted concentration of $CO_2$ (in days) in the enclosure of the CMR 50 when the input data of FIG. 19 is input to the predictive computer model.
Figure 28:
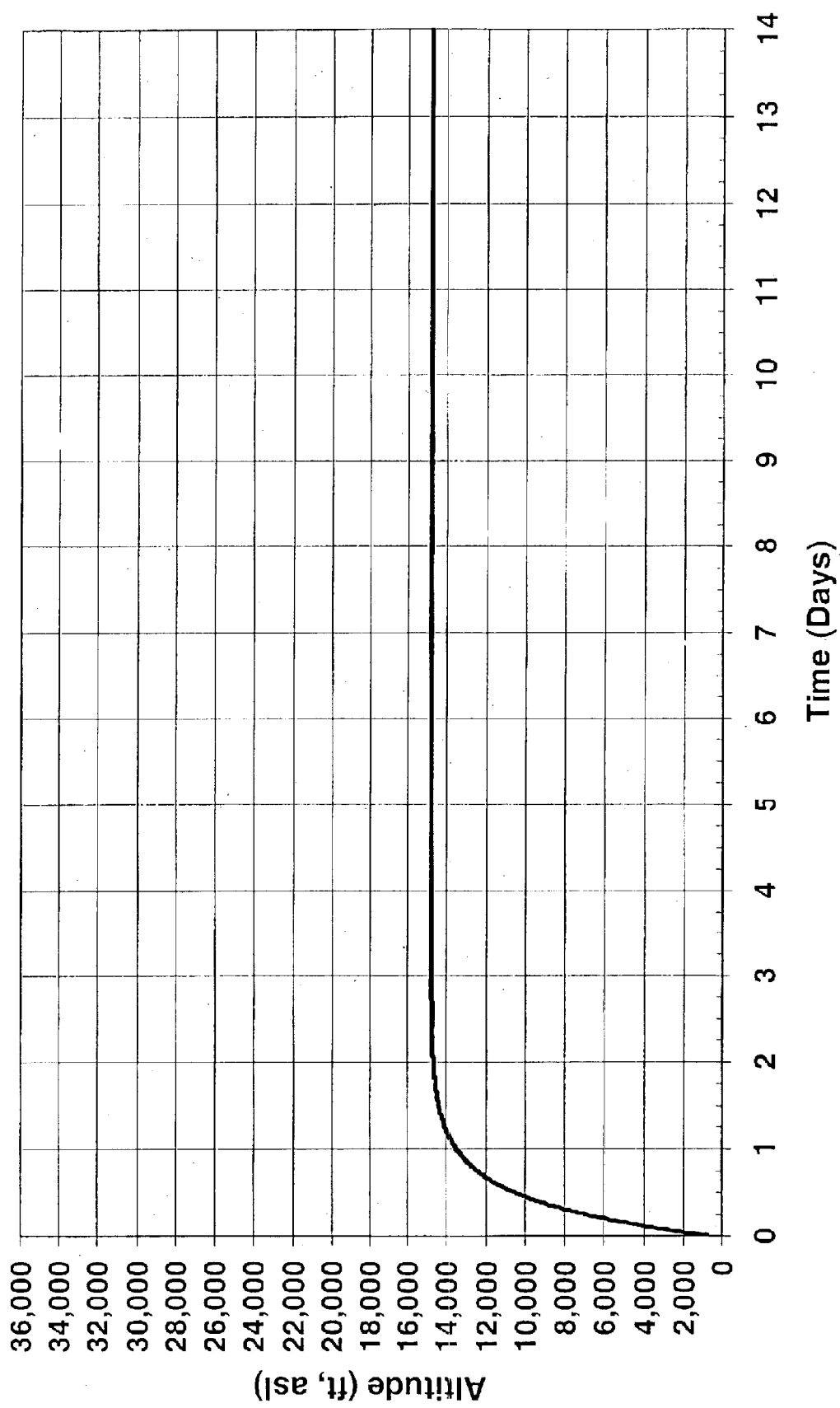
FIG. 28 shows another graph of the predicted simulated altitude (in days) in the enclosure of the CMR 50 when the input data of FIG. 19 is input to the predictive computer model.

High level steps performed by the predictive computer model of the CMR 50 are shown in FIG. 18. Additionally, FIG. 19 shows another set of input or initialization data for the predictive computer model and FIGS. 20 through 28 show graphs of various predicted environmental conditions within the enclosure of the CMR 50 as a function of time that the CMR 50 is operating/installed.

The following variables and equations are used in the predictive computer model of the present invention:

Variables t=time delta t=one time interval, 15-minutes

Equation 1

$O_2$ Volume at $t$ (liters)=(Percent $O_2$ at $t-1$)/100)*Room Volume (liters)

Equation 2

$O_2$ Consumption by People at $t$ (liters)=[delta $t$ (min*People in Room*$O_2$ consumption rate (liters/min)]*[Actual Pressure (mb)/Sea Level Pressure (mb)]

Equation 3

$O_2$ Concentrator Removal at $t$ (liters)=[delta $t$ (min)*[1013.25/Actual Pressure (mb)]*[0.9*[Percent $O_2$ at $t-1$/20.94]]*[$O_2$ Removal Rate per System (liters/min)*Number of $O_2$ Concentrators]*[Percent $O_2$ at $t-1$/20.94]

Equation 4

$O_2$ Exchange out of CMR at $t$ (liters)=[delta $t$ (min)]*[Air Change Rate $(hr^{-1})$ /60]*[Room Volume (liters)*Percent $O_2$ at $t-1$/100]

Equation 5

$O_2$ Exchange into CMR at $t$ (liters)=[delta $t$ (min)]*[Air Change Rate $(hr^{-1})$/60]*[Room Volume (liters)*20.94/100]

Equation 6

$CO_2$ Volume at $t$ (liters)=[$CO_2$ Concentration at $t-1$ (ppm)/1,000,000]*Room Volume (liters)

Equation 7

$CO_2$ Production from People at $t$ (liters)=[delta $t$ (min)*People in Room*$CO_2$ Production rate (liters/min)]*[Actual Pressure (mb)/Sea Level Pressure (mb)]

Equation 8

$CO_2$ Exchange out of CMR at $t$ (liters)=[delta $t$ (min)]*[Air Change Rate $(hr^{-1})$/60]*[Room Volume (liters)*$CO_2$ Concentration at $t-1$ (ppm)/1,000,000]

Equation 9

$CO_2$ Exchange into CMR at $t$ (liters)=[delta $t$ (min)]*[Air Change Rate $(hr^{-1})$/60]*[Room Volume (liters)*Outdoor $CO_2$ Concentration (ppm)/1,000,000]

Equation 10

$CO_2$ Scrubber Removal at $t$ (liters)=[delta $t$ (min)]*$CO_2$ Scrubber Airflow Rate (liters/min)*[$CO_2$ Scrubber Efficiency (%)/100]*[$CO_2$ Concentration at $t-1$ (ppm)/1,000,000]

Equation 11

Percent $O_2$ at $t$=100*[Equation 1-Equation 2-Equation 3-Equation 4+Equation 5]/Room Volume (liters)

Equation 12

Simulated Altitude at $t$ (feet)=[3.28084*1000]*[−0.1112+[[−0.1112$^2$]+[4* 0.00149]*[6.63268−$Ln$ [[Equation 11*Actual Pressure ($mb$)/Initial Percent $O_2$]*[760/1013.25]]]$^{0.5}$]/[2*0.00149]

Equation 13

$CO_2$ Concentration at $t$ (ppm)=[Equation 6+Equation 7−Equation 8+Equation 9−Equation 10]*[1,000,000/Room Volume (liters)]

Figure 12:
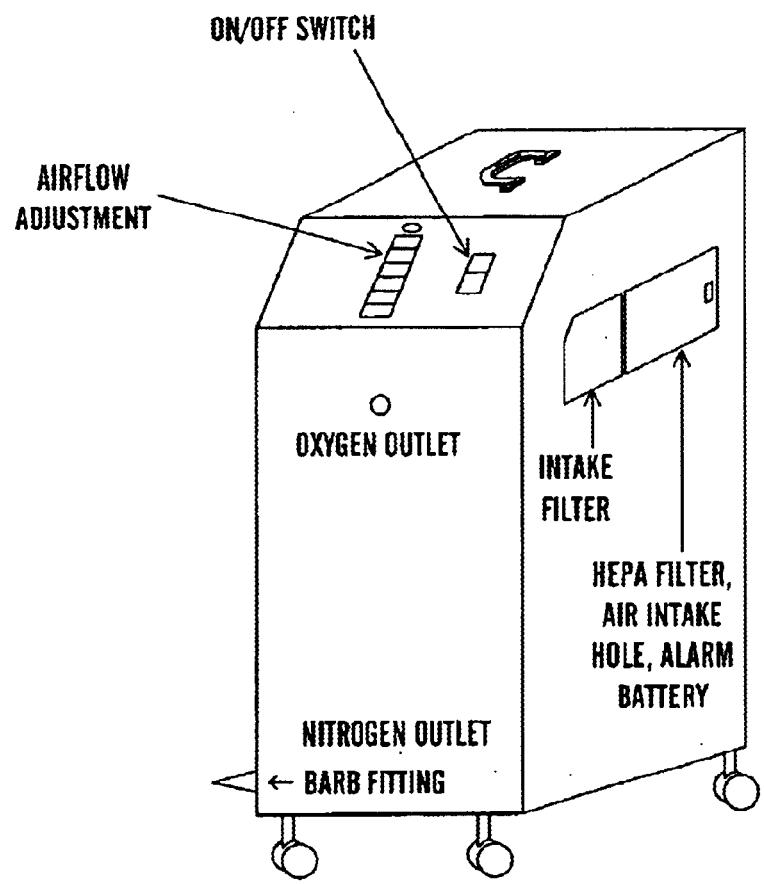
FIG. 12 shows one embodiment of an oxygen concentrator for the present invention.

Further detail of the oxygen concentrator is provided in FIG. 12. The concentrator has three ports. One port is an intake air line for air from in or out of the simulated altitude space. The second port exhausts oxygen out of the simulated altitude space. The third port delivers nitrogen into the simulated altitude space.

Plug the concentrator into the carbon dioxide scrubber and connect the oxygen hose to oxygen outlet on the front of the concentrator. Drill a hole in an outside wall and either run the oxygen hose directly outside or install brass tubing through the wall and attach the hose to the brass tubing. Seal the hose or tubing on both sides of the wall, inside and outside the room, with caulking.

The $O_2$ concentrator may be placed in a space adjacent to the altitude simulation room and as close as possible to the CO2 Scrubber, which is in the enclosure of the CMR.

When the oxygen concentrator is installed outside the enclosure of the CMR, several holes need to be drilled. One hose will deliver nitrogen into the room, one hose exhausts oxygen outside, and the last hose will provide intake air from the room. The intake air hose should be 4 to 6 inches above the floor. Both the nitrogen and intake air hoses may be placed in a wall or door.

Installation Equipment

Connect the intake air hose to the filter hole of the concentrator behind the door panel. The HEPA filter is inside the hole when it is provided. Take the HEPA filter out of the concentrator. Place the HEPA filter on the end of the hose. Seal both sides of the wall around the hose, inside and outside the room, with caulking. Attach the intake air hose to the wall with the filter in an upright position.

As shown in FIG. 12, nitrogen may be delivered into the room through a hose that connects to the brass barb fitting at the bottom left of the concentrator. The nitrogen hose should be placed in the wall above eye level. Seal both sides of the wall around the hose, inside and outside the room, with caulking.

The ventilator fan supplies fresh air into the enclosure of the CMR 50 and accordingly provides oxygen to the enclosure. In one embodiment, even when the desired simulated altitude is reached, the $O_2$ concentrator continues to operate, decreasing the oxygen concentration in the room, and continuing to raise the simulated altitude. When the simulated altitude reaches approximately 100 to 300 feet over the desired altitude, the fan turns on bringing in fresh air until the level is approximately 100 to 300 feet below the desired level. This process for achieving the desired simulated altitude can take over an hour and does not affect altitude acclimatization by a user. Moreover, this process provides the altitude simulation enclosure with a substantial volume of fresh air while maintaining the desired oxygen concentration.

The fan can be installed numerous ways. It can be installed on any interior wall that has access to an adjacent open space i.e. another room or hallway. It can also be installed on a door.

To mount the fan on the door it is recommended that the fan should be mounted around eye level.

With all the wires attached to the wall seal around the assembly with caulk. Attach the grill to cover the hole opposite the ventilator fan.

In one embodiment, the oxygen sensor and $CO_2$ sensor can be mounted to the wall. The sensors can also be set on a piece of furniture. To mount the sensors to the wall preferably choose a spot on the wall 4 to 6 feet from the bed. Note that in an alternative embodiment, the oxygen sensor and $CO_2$ sensors may be contained within the control panel.

Moreover, if the CMR 50 is of sufficient size, more than one oxygen sensor and/or $CO_2$ sensor can be provided therein.

Figure 13:
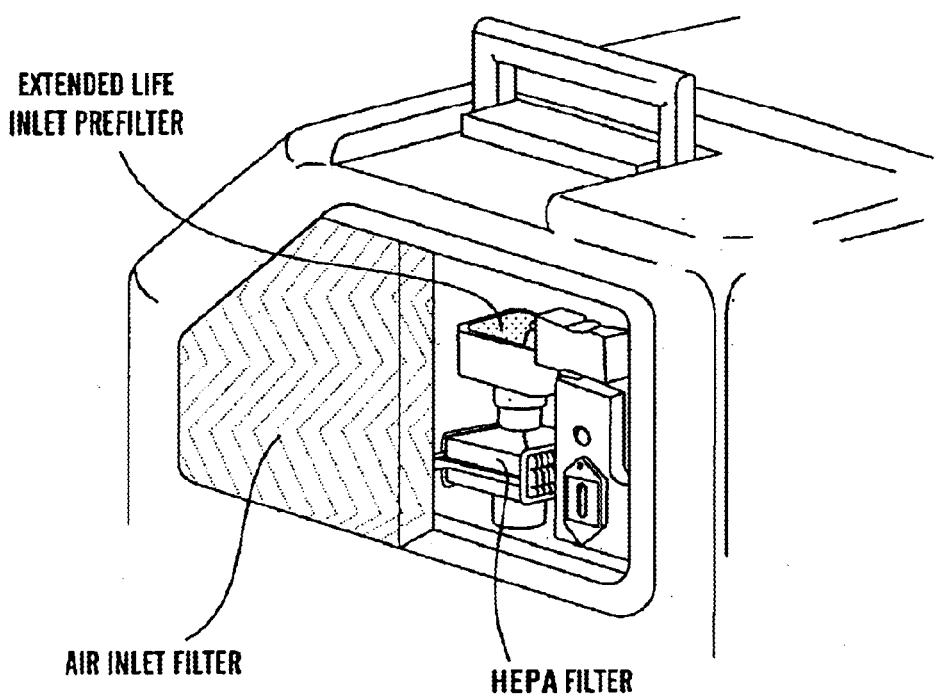
FIG. 13 shows a perspective view of three filters that may be provided in an oxygen concentrator for the present invention.

The $CO_2$ Scrubber needs to be placed in the CMR enclosure within close proximity of the oxygen concentrator so that they can be operatively connected. The $O_2$ concentrator includes three filters: the intake filter, the extended life inlet pre-filter, and the HEPA filter as shown in FIG. 13.

Low Altitude Simulation.

Figure 4:
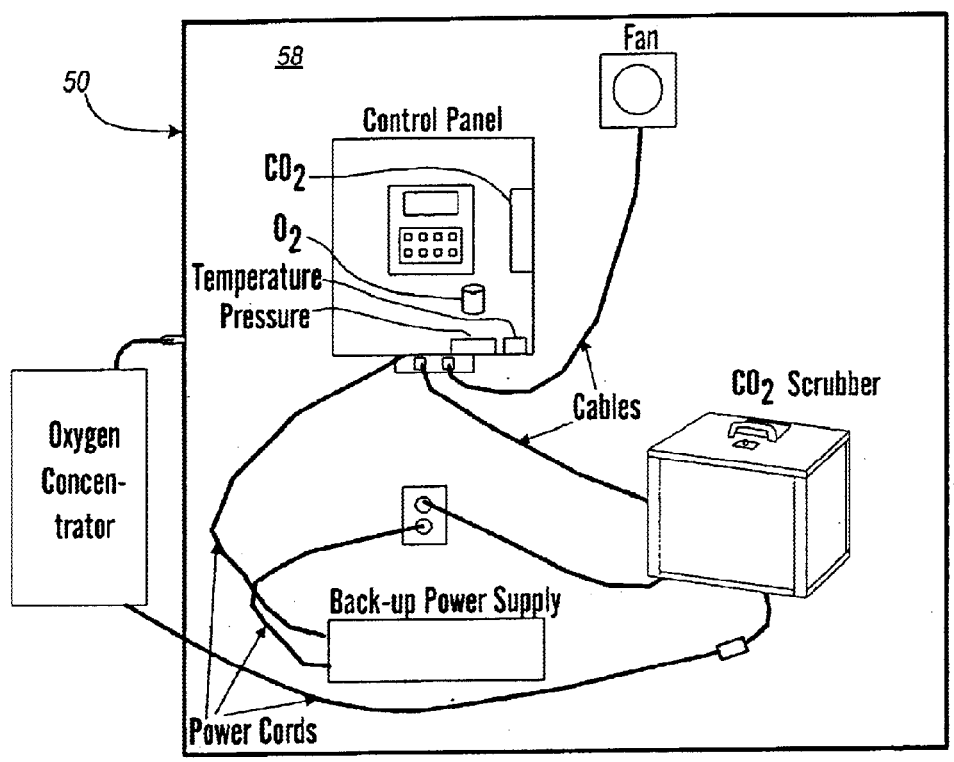
FIG. 4 shows an embodiment of the present invention configured to simulate a low altitude enclosure.

A detailed description of this embodiment is provided herein and shown in FIG. 4.

In low altitude mode the oxygen concentrator provides oxygen rich air to the enclosed environment and vents nitrogen outside the room. The following conditions and actions are performed by various embodiments of the invention.

(1) Fans—off
(2) Gate—closed
(3) O2 concentrator—running
(4) CO2 scrubber—on if CO2 levels are higher than 500 PPM
(5) Alarm—silent
(6) Fans—open and blowing for 20 seconds
(7) Gate—open
(8) O2 concentrator—running
(9) CO2 scrubber—on if CO2 levels are higher than 500 PPM
(10) Alarm—silent
(11) Fans—open and blowing until safe levels are reached
(12) Gate—open
(13) O2 concentrator—off until safe levels are reached
(14) CO2 scrubber—on if CO2 levels are higher than 500 PPM
(15) Alarm—sounds
(16) Fans—open or closed depending on O2 levels as above
(17) Gate—open or closed depending on O2 levels as above
(18) O2 concentrator—on or off depending on O2 levels as above
(19) CO2 scrubber—off
(20) Alarm—on or off depending on O2 levels as above
(21) Fans—open or closed depending on O2 levels as above
(22) Gate—open or closed depending on O2 levels as above
(23) O2 concentrator—on or off depending on O2 levels as above
(24) CO2 scrubber—on
(25) Alarm—on or off depending on O2 levels as above
(26) Fans—open or closed depending on O2 levels as above
(27) Gate—open or closed depending on O2 levels as above
(28) O2 concentrator—on or off depending on O2 levels as above
(29) CO2 scrubber—on
(30) Alarm—on or off depending on O2 levels as above
(31) Fans—open and running
(32) Gate—open
(33) O2 concentrator—on or off depending on O2 levels as above
(34) CO2 scrubber—on
(35) Alarm—sounds
(36) Fans—on or off depending on O2 and CO2 levels as above (battery back up)
(37) Gate—open (power required to keep closed)
(38) O2 concentrator—failed
(39) CO2 scrubber—failed
(40) Alarm—on or off depending on O2 and CO2 levels as above (battery back up is provided for the alarm)

$O_2$ and $CO_2$ levels are monitored constantly. The decision whether to turn on the fan occurs every 5 minutes.

There is no need for the $CO_2$ scrubber to operate when $CO_2$ levels are near ambient levels.

Since real altitude effects simulated altitude, the controller 58 must limit $O_2$ to 25% in high oxygen mode (i.e., low altitude simulations).

High $CO_2$ Simulation.

The Colorado Mountain Room 50 creates a controlled carbon dioxide environment, and in particular, can provide a high $CO_2$ environment. Using the present method and system, individuals derive the benefits of restful sleep, using elevated carbon dioxide concentrations as a sleep-aid. There are no adverse health effects or side effects known for this treatment. Many traditional therapies involve the use of chemical sleep aids with a variety of side effects.

Figure 5:
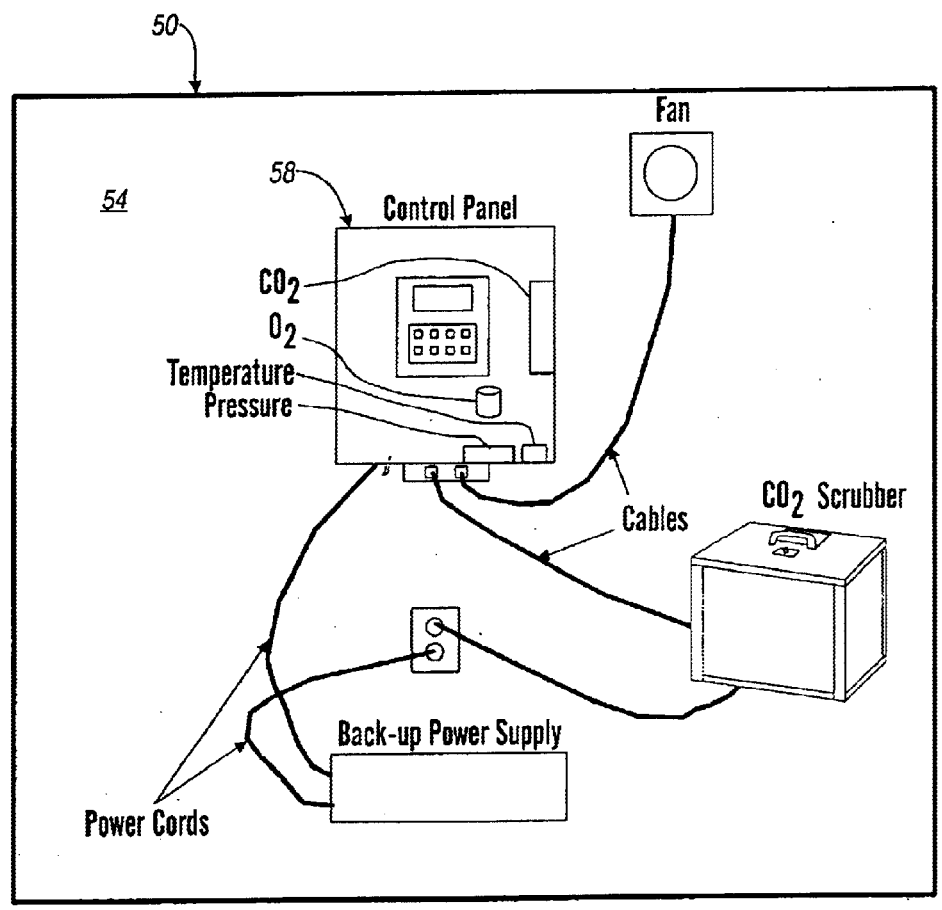
FIG. 5 shows an embodiment of the present invention configured to provide a higher than normal atmospheric content of $CO_2$.

FIG. 5 shows an embodiment of the CMR for high $CO_2$ simulation.

High concentrations of Carbon Dioxide (>1,000 parts per million) are known to cause drowsiness without adverse health effects.

The $CO_2$ sensor in the Control Panel monitors the $CO_2$ concentration in the room. When occupied, the $CO_2$ concentration in the room slowly increases. When the concentration exceeds user-selected set point (e.g., approximately 3,000 to 4,500 ppm, and more preferably approximately 3250 ppm), the Control Panel activates the $CO_2$ scrubber to reduce the concentration. Should the $CO_2$ concentration become unhealthy, the Control Panel activates the ventilation fan and sounds a warning alarm until the concentration lowers to a healthy one (e.g., approximately 5000 to 10,000 ppm).

In this embodiment, the Colorado Mountain Room 50 controller 58 also monitors the oxygen partial pressure. Should the oxygen partial pressure in the room decrease to an unhealthy level (e.g. approximately 13,000 to 15,000 feet), the Control Panel activates the ventilation fan and sounds a warning alarm until the concentration becomes acceptable again (e.g., approximately 6,000 to 9,000 feet).

Portable Altitude Simulation

Figure 6:
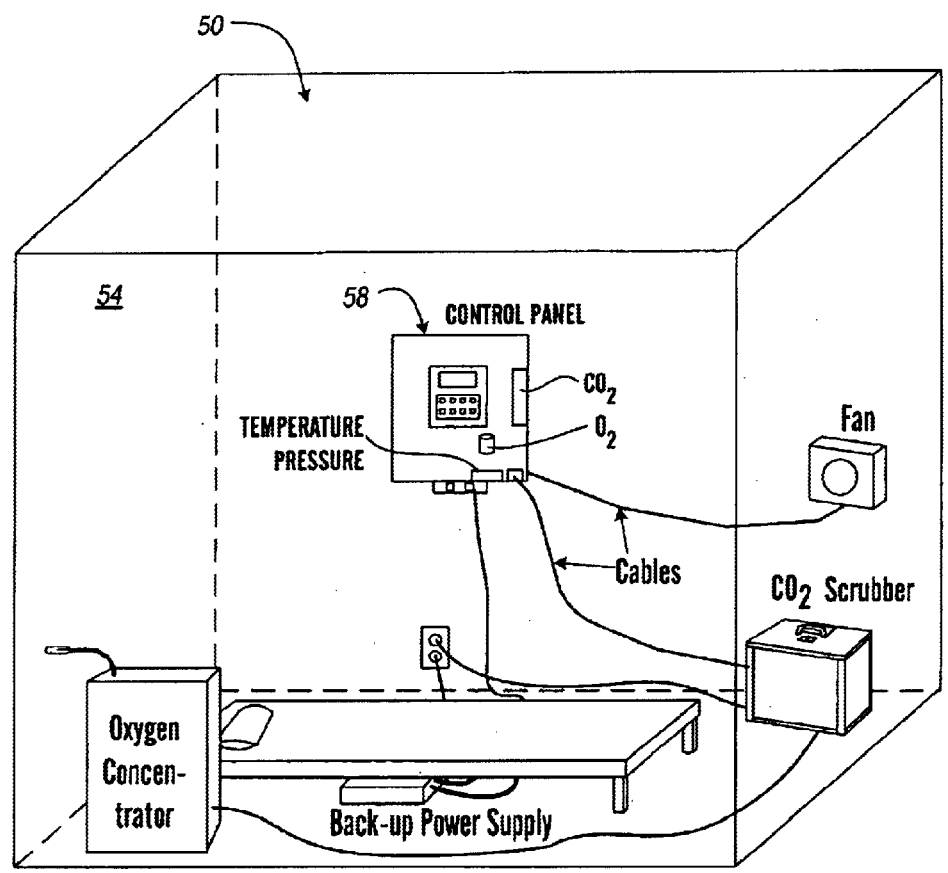
FIG. 6 shows an embodiment of the present invention that is portable and configured to simulate a higher altitude than the ambient exterior altitude.

FIG. 6 shows an embodiment of the CMR that is portable. In some embodiments, it is preferable that the Colorado Mountain Room 50 have an air infiltration rate of less than 0.1 Air Changes per Hour (ACH) to be effective. However, higher air infiltration rates can be accommodated by incorporating additional oxygen concentrators and/or reducing the size of the CMR 50.

The portable CMR embodiment at FIG. 6 encloses the Colorado Mountain Room 50 system in a tent or other portable structure. The tent or portable structure has a fixed volume and a fixed air infiltration rate. The present embodiment functions in the same ways as a stationary CMR.

The present embodiment has the following features:

1. It is portable. The user can assemble it, use it, disassemble it, transport it, and store it at will.
2. It has a fixed volume regardless of its operating location. Therefore, the altitude simulation system will be identical for each time it is used.
3. It has a fixed and permanent air infiltration rate. Therefore, no trained personnel or extra costs are required to assemble or use the present portable embodiment.
4. It can be assembled and used inside an existing room. This eliminates the need to permanently alter the interior of the room to provide a CMR. Furthermore, if the existing room is air-conditioned or cooled by other means, no supplemental cooling is required inside the embodiment of the invention.

As with other embodiments, the user enters the actual altitude and the desired altitude using the keypad on the front of the panel. Once the panel is set, the system starts and the oxygen concentrator is activated by the panel. The oxygen concentrator runs intermittently under normal operating conditions. When the oxygen partial pressure reaches the desired level (desired altitude), the panel turns the concentrator off. Should the oxygen partial pressure decrease significantly below the desired level (desired altitude), the panel activates the ventilation fan. The ventilation fan provides ambient air from outside the enclosure. This air contains ambient levels of oxygen. It increases the oxygen partial pressure in the enclosure (lowers the altitude) as a safety feature.

When the carbon dioxide level exceeds 1,000 ppm, the scrubber is activated and runs until the carbon dioxide concentrations falls below 1,000 ppm again. If the carbon dioxide concentration exceeds 7,000 ppm, due to increased activity or old absorbent material, the ventilation fan is activated and an alarm sounds.

Figure 7:
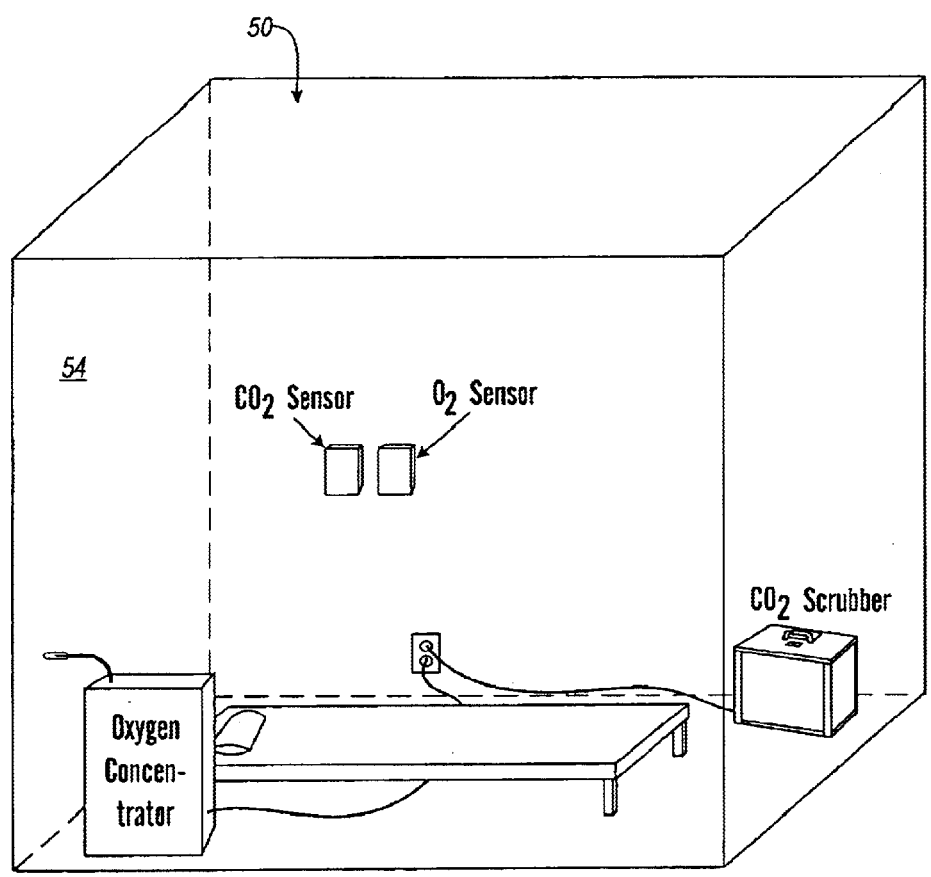
FIG. 7 shows another embodiment of the present invention that is portable and configured to simulate a higher altitude than the ambient exterior altitude and wherein the control thereof is substantially manual.

An alternative portable embodiment of the invention is shown in FIG. 7. This alternative embodiment also provides a tent or other portable structure as the enclosure. The tent or portable structure has a fixed volume and a fixed air infiltration rate.

This alternative embodiment has the same features as identified above for the initial portable embodiment use thereof. However, whereas the above initial portable embodiment is controlled by the controller, the present alternative portable embodiments has its equipment manually controlled by the user.

Thus, the user adjusts the flow rate of the Oxygen Concentrator to maintain a simulated altitude according to displays providing the $CO_2$ concentration and the $O_2$ percentage inside the enclosure provided to the Carbon Dioxide sensor and an Oxygen sensor. Note that the flow rate and the $O_2$ percentage necessary to achieve the simulated altitude are determined using the Colorado Mountain Room 50 Computer Model previously discussed.

Moreover, the user also manually adjusts the flow rate of the Carbon Dioxide Scrubber to control the $CO_2$ concentration inside the enclosure. If the $CO_2$ concentration exceeds 7,000 ppm, an alarm sounds.

Figure 8:
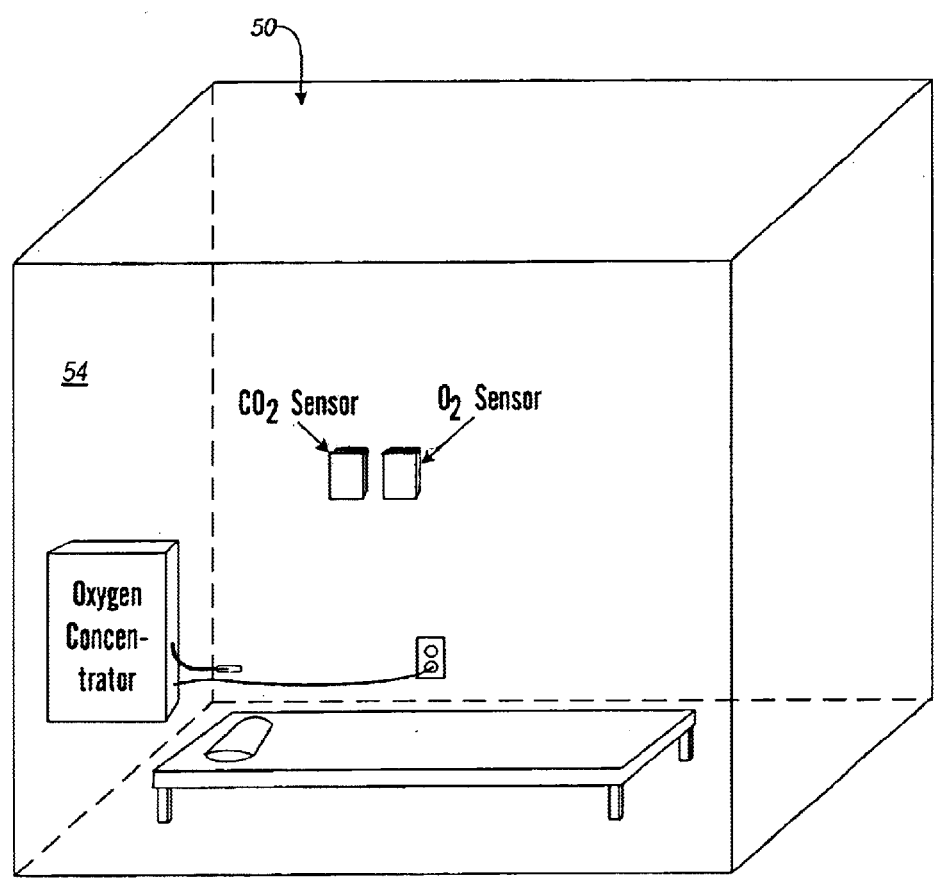
FIG. 8 shows another embodiment of the present invention that is portable and configured to simulate a higher altitude than the ambient exterior altitude, and wherein the enclose is not tightly sealed (i.e., it is "leaky").

FIG. 8 shows a third embodiment of the invention that is portable. This third portable embodiment also provides a tent or other portable structure as the enclosure. The tent or portable structure has a fixed volume and is breathable (e.g., leaky) instead of substantially non-leaky as in the above two embodiments.

This third portable embodiment has the following features:

1. It is portable. The user can assemble it, use it, disassemble it, transport it, and store it at will.
2. It has a fixed volume.
3. It is leaky. Therefore, no trained personnel or extra costs are required to assemble or use the Colorado Moveable Mountain Room.
4. It can be assembled and used inside an existing room. This eliminates the need to permanently alter the interior of the room to create a Colorado Mountain Room 50. Furthermore, if the existing room is air-conditioned or cooled by other means, no supplemental cooling is required inside the Colorado Moveable Mountain Room.

As in the above alternative embodiment, this third embodiment may be manually controlled by the user. A carbon dioxide sensor and an oxygen sensor monitor and display the $CO_2$ concentration and the $O_2$ percentage inside the enclosure.

The oxygen concentrator injects Oxygen-depleted (Nitrogen-enriched) air into the enclosure. The user adjusts the flow rate of the Oxygen Concentrator to maintain a simulated altitude. The flow rate and the $O_2$ percentage necessary to achieve the simulated altitude are determined using the Colorado Mountain Room 50 Computer Model previously discussed. As in the other embodiments, if the simulated altitude exceeds 15,000 feet, an alarm sounds.

Note that in this third portable embodiment, the carbon dioxide concentration is not elevated because the enclosure is breathable (leaky). The flow rate of the oxygen concentrator is sufficiently powerful to overcome the leakiness of the enclosure. The $CO_2$ sensor displays the $CO_2$ concentration inside the enclosure. If the $CO_2$ concentration exceeds 7,000 ppm, an alarm sounds.

Figure 9:
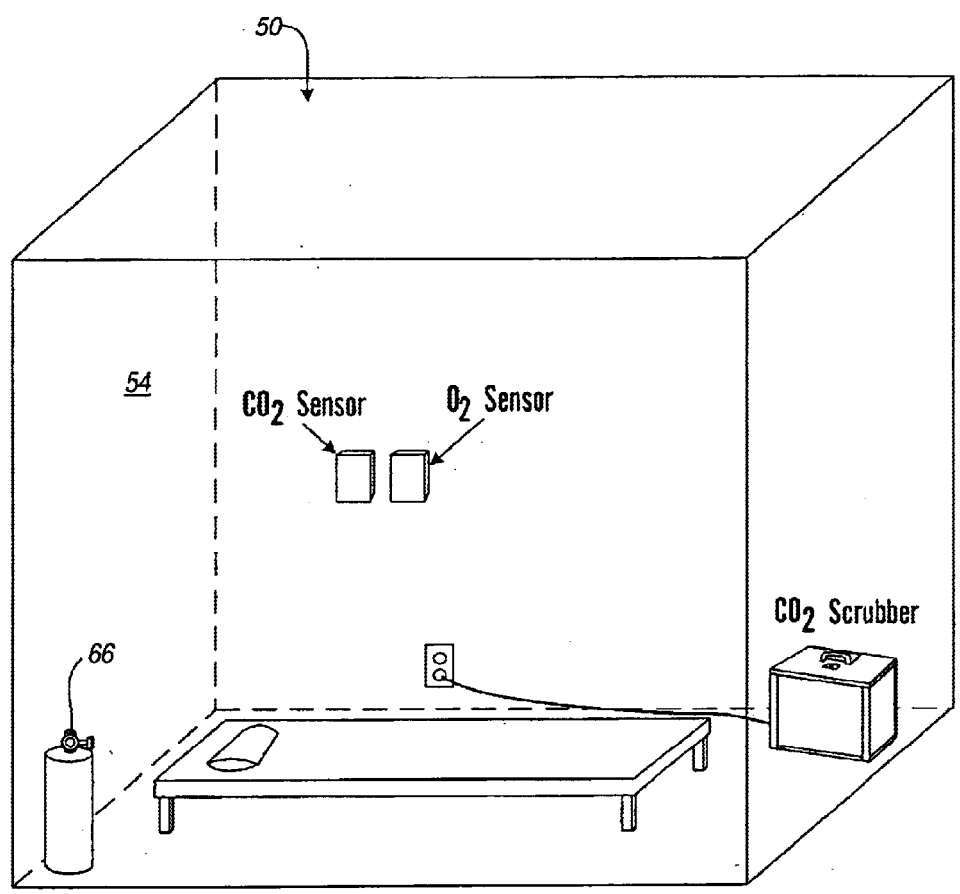
FIG. 9 shows another embodiment of the present invention that is portable and configured to simulate a higher altitude than the ambient exterior altitude, and wherein the enclose is not tightly sealed and instead has a substantially constant air infiltration rate. Note that a nitrogen filled container may be used to decrease the oxygen content of the CMR 50.

A fourth portable embodiment of the invention is shown in FIG. 9. This fourth embodiment also includes a tent or other portable structure as the enclosure. The tent or portable structure has a fixed volume and a fixed air infiltration rate. The present embodiment has the following features:

1. It is portable. The user can assemble it, use it, disassemble it, transport it, and store it at will.
2. It has a fixed volume. Therefore, the altitude simulation system will be identical for each use.
3. It has a fixed and permanent air infiltration rate. Therefore, no trained personnel or extra costs are required to assemble or use.
4. It can be assembled and used inside an existing room. This eliminates the need to permanently alter the interior of the room to create a Colorado Mountain Room 50. Furthermore, if the existing room is air-conditioned or cooled by other means, no supplemental cooling is required inside the enclosure.

The present fourth embodiment may be manually controlled by a user or controlled by a computerized controller. Note that FIG. 9 shows the manually controlled embodiment in that no controller is shown. A carbon dioxide sensor and an oxygen sensor monitor and display the $CO_2$ concentration and the $O_2$ percentage inside the enclosure.

The controller or the user adjusts the flow rate of the nitrogen cylinder (label?) to maintain a simulated altitude. The flow rate and the $O_2$ percentage necessary to achieve the simulated altitude are determined using the Colorado Mountain Room 50 Computer Model previously discussed. If the altitude exceeds 15,000 feet, an alarm sounds.

The controller or the user also adjusts the flow rate of the Carbon Dioxide Scrubber to control the $CO_2$ concentration inside the enclosure. The $CO_2$ sensor displays the $CO_2$ concentration inside the enclosure. If the $CO_2$ concentration exceeds 7,000 ppm, an alarm sounds.

Figure 10:
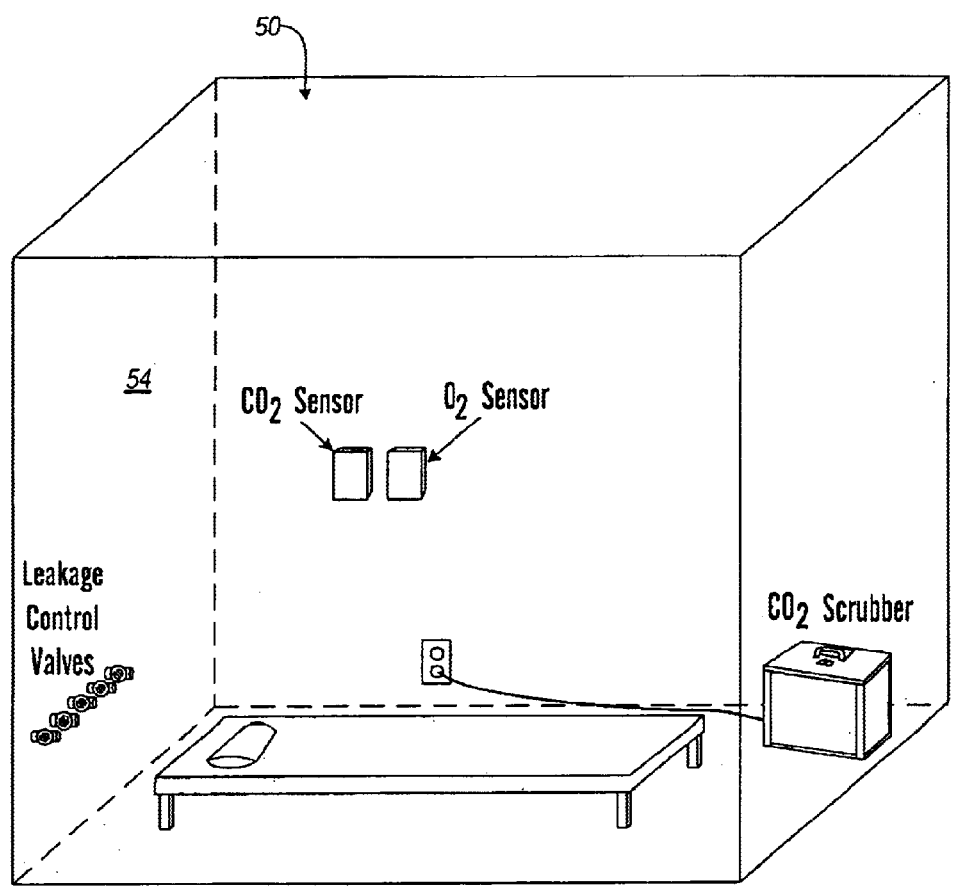
FIG. 10 shows another embodiment of the present invention that is portable and configured to simulate a higher altitude than the ambient exterior altitude, and wherein the enclosure is not tightly sealed and instead has a substantially constant air infiltration rate.

A fifth portable embodiment of the invention is shown in FIG. 10. The present embodiment includes a tent or other portable structure as its enclosure. The tent or portable structure has a fixed volume and a fixed air infiltration rate. The present embodiment has the following features:

1. It is portable. The user can assemble it, use it, disassemble it, transport it, and store it at will.
2. It has a fixed volume. Therefore, the altitude simulation system will be identical for each use.
3. It has a fixed and permanent air infiltration rate. Therefore, no trained personnel or extra costs are required to assemble or use.
4. It can be assembled and used inside an existing room. This eliminates the need to permanently alter the interior of the room to create a Colorado Mountain Room 50. Furthermore, if the existing room is air-conditioned or cooled by other means, no supplemental cooling is required inside the enclosure.

This fifth embodiment may be manually controlled by the user controlling the infiltration rate of air from outside the CMR 50. For example, it has been discovered by the Applicants that if the enclosure material has a know air permeability (e.g., substantially zero or otherwise), then predetermined closable vents (as shown in FIG. 10) may be provided in the material, wherein by opening a certain combination of one or more of the vents, the CMR 50 will obtain a corresponding predetermined air infiltration rate (e.g., the air exchange per hour) into the enclosure. Accordingly, by also knowing the size of the enclosure, the number of occupants, and their activity levels within the enclosure, the prediction model for the present invention (via the prediction model) is able to accurately predict the $O_2$ concentration of the enclosure at a maximum simulated altitude equilibrium state. Accordingly, the present embodiment of the invention does not require a controller for controlling the altitude simulation. Thus, a user of the present embodiment may lookup on a chart, generated from the prediction model (for his/her particular instance of the CMR 50), to determine the combination of vents to be open for his/her current altitude and the desired simulated altitude.

Moreover, note that the present embodiment does not include an oxygen concentrator. However, a carbon dioxide sensor and an oxygen sensor monitor and display the $CO_2$ concentration and the $O_2$ percentage may be provided inside the enclosure although such devices are not necessary in some embodiments.

The user occupies the enclosure and consumes oxygen. This causes the simulated altitude inside the enclosure to increase. The desired altitude is achieved by adjusting the Infiltration Control Valves. The air infiltration rate and the $O_2$ percentage necessary to achieve the simulated altitude are determined using the Colorado Mountain Room 50 Computer Model previously discussed. If the altitude exceeds 15,000 feet, an alarm sounds.

The user may manually adjust the flow rate of the carbon dioxide scrubber to control the $CO_2$ concentration inside the enclosure. The $CO_2$ sensor displays the $CO_2$ concentration inside the enclosure. If the $CO_2$ concentration exceeds 7,000 ppm, an alarm sounds.

Hybrid Simulation of Altitude

Because some people find it difficult to sleep at high altitudes or in low oxygen environments, the Colorado Mountain Room can be configured in an embodiment that incorporates the high CO2 embodiment with the low altitude/high oxygen embodiment thus producing a stimulus to sleep—high CO2 and removing an obstacle to sleep—high altitude or low oxygen.

Air Exchange Rate in the Colorado Mountain Room 50

In all but the "leaky" third embodiment of the invention, the Colorado Mountain Room 50 preferably must have a low air exchange rate to function cost effectively. An air exchange rate of 0.1 air changes per hour or lower is recommended. There are two challenges that must be overcome to achieve the desired air exchange rate. First, one must be able to locate very small leaks in the room in order to seal them. Second, one must determine the actual air exchange rate in the room.

Very small air leaks may prevent the Colorado Mountain Room 50 from achieving the 0.1 air change per hour air exchange rate that is recommended. These leaks are found as follows:

1. Pressurize the Colorado Mountain Room 50 by blowing air into it using a vacuum with a hose attachment. The hose attachment must penetrate into the closed room through a temporary hole that is sealed against leakage. The hole where the ventilation fan is installed works well for this purpose.

2. While the room is pressurized, use a thermal anemometer (hot-wire anemometer) attached to a sensing wand to search for small airflows. Any airflow above 0 feet per minute suggests a leak. Leaks typically occur around door seals, window seals, wall joints, ceiling joints, floor joints, light penetrations, and switch penetrations.

The air exchange rate in a home is typically measured using a large fan and a differential pressure sensor. All the doors and windows in the home are closed and the fan is installed in one of the doors. The fan blows a large amount of air into the home, pressurizing it. When the fan is stopped, a stopwatch and the differential pressure sensor are used to determine how long the home remains pressurized. The air exchange rate can then be computed. This method works for air exchange rates as small as 0.5 air changes per hour. The air exchange rate in the Colorado Mountain Room 50 may be as small as 0.01 air changes per hour and must be less than 0.1 air changes per hour. The present invention includes a $CO_2$ leakage method and system for determining the air exchange rate in an embodiment of the Colorado Mountain Room 50.

The $CO_2$ leakage method and system performs the following steps to determine the air exchange rate in the Colorado Mountain Room 50:

1. Seal the Colorado Mountain Room 50.
2. Close the entrance to the Colorado Mountain Room 50.
3. Raise the $CO_2$ concentration in the Colorado Mountain Room 50 to about 5,000 ppm. This may be done by either vigorously exercising in the room or by releasing $CO_2$ into the room from a gas cylinder.
4. Terminate the release of $CO_2$ in the room.
5. Note the peak $CO_2$ concentration achieved and the time of occurrence.
6. Wait for several hours. The longer one waits, the more accurate the method becomes.
7. Note the $CO_2$ concentration and the time of occurrence again.
8. Set the appropriate initial conditions in the Colorado Mountain Room 50 Computer Model.
9. Obtain a prediction of the $CO_2$ concentration in the Colorado Mountain Room 50 at the time noted in Step 7.
10. If the predicted $CO_2$ concentration is lower than the concentration observed in Step 7, reduce the air change rate in the Computer Model.
11. If the predicted $CO_2$ concentration is higher than the concentration observed in Step 7, increase the air change rate in the Computer Model.
12. Repeat Steps 9–11 until the predicted $CO_2$ concentration matches the observed one.

Once the air exchange rate is determined and is less than 0.1 air changes per hour, the Colorado Mountain Room 50 can be used to simulate either high and/or low altitudes. The Colorado Mountain Room 50 Computer Model should accurately predict the time necessary to achieve the simulated altitude, using the air exchange rate determined in Steps 1–12 immediately above.

When a user of the invention enters the actual altitude and the desired altitude using the keypad on the front of the input and display panel, the CMR 50 starts and the oxygen concentrator is turned on by the controller (if used). The oxygen concentrator runs continuously under normal operating conditions in at least some embodiments. When oxygen levels reach the desired level in the enclosure, the controller turns on the fan to provide external air to the enclosure. This intake air has a different oxygen concentration than the air in the enclosure. The fan is turned on and off to maintain the desired oxygen concentration. When the carbon dioxide level reaches 1,000 PPM the scrubber is turned on low and runs until the carbon dioxide level is reduced to about 750 PPM. If carbon dioxide levels continue to rise, due to increased activity or old absorbent material, the scrubber speed is increased to medium at 3,000 PPM and high speed at 5,000 PPM. Scrubber speed is reduced as the carbon dioxide level is reduced.

Starting the CRM is simple. On the control panel there is a digital readout and a set of buttons to use to enter actual altitude and desired altitude.

(a) When the control panel is plugged in the starting screen will come up with "Colorado Altitude Training" displayed.
(b) Select high altitude mode for decreased oxygen. (An alternative low altitude mode can also be used if the equipment is used correctly).
(c) Within a few seconds a screen asking for the Actual Altitude of the user will display.
(d) Using the + button to go up in 100 ft increments and – button to go down in 100 ft increments set the altitude that you live at and then push the Set button.
(e) The following screen shows the user what the Actual Altitude has been set to.
(f) If this actual altitude is correct press the Next button. If not press the reset button
(g) The following screen asks the user to enter the Desired Altitude.
(h) Using the + and – buttons the can set the altitude desired and then pushes the Set button.
(i) The display will show the Desired Altitude.
(j) If the desired altitude is correct the user presses the "Next" button. The CRM 50 will then start operating. However, if the altitude shown is not the desired altitude then press the reset button
(k) To reprogram the system for a new altitude press the reset button and begin the process over.
(l) The final screen shows the current simulated altitude (the altitude being simulated at the moment) and the current oxygen concentration in the room. It also shows the desired altitude that was selected. $CO_2$ levels are also shown.
(m) The simulated altitude reading displayed immediately after starting the CMR 50 should read within 500 feet plus or minus the actual altitude. This is important to establish the accuracy of the oxygen sensor, and the resulting simulated altitudes. If the display reading is off more than 500 feet recalibration and/or sensor malfunction may be necessary.

The response to altitude varies tremendously from person to person. What may be too high for one person may be easily tolerated by another. Even an individual's response may vary from time to time. What cannot be tolerated today may be tolerated at a later date. To reduce the likelihood of altitude sickness when using the present invention to simulate a higher altitude, a user should start off using the following protocol and monitor you're his/her reaction to simulated altitude increases. If there are any of the symptoms of altitude sickness, a user should preferably discontinue use of the present invention for approximately 24 hours and back off to a lower altitude setting (higher oxygen setting) in the next use of the equipment thereby giving more time to acclimatize. A good rule of thumb is to allow at least one day of acclimatization for every 1,000 feet of elevation gain above 7,000 feet.

Studies show that 6–12 hours exposure to altitude per day is sufficient to produce the acclimatization effect in the COLORADO MOUNTAIN ROOM 50. However, there is no harm in extending that time per day. The present invention may be used any time of day for any activity such as reading, watching TV, talking on the telephone, lap top computer work etc.

The following protocols are suggested for using the present invention to simulate a higher altitude.

For users at a location less than 5,000 feet above sea level:
Phase 1—Spend 3–5 days at approximately 7,000 feet. Do not exceed 9,000.
Phase 2—Spend at least 4–5 days at approximately 9,500 feet. Do not exceed 11,500 feet.
Phase 3—Spend at least 5–7 days at approximately 12,000 feet. Do not exceed 13,500 feet.
Phase 4—Sleep at 14,000–15,000 feet from then on. But the user should have had at least 12 consecutive days of acclimatization where he/she is exposed to altitude at least 6–8 hours per day. Do not exceed 15,000 feet at any time.

Note that the simulated altitude may be increased with the control panel in increments as small as 100 feet.

After a 2–3 day interruption go back one phase (e.g., after four days at phase 3 and then three days at sea level; go back to phase 2 for further use of the CMR 50.) After a 4–7 day interruption go back two phases (e.g., after 5 days at phase 4 you spend 7 days at sea level; go back to phase 2). After an interruption of more than 7 days or more go back to phase 1.

For users at a location that is between 5,000 and 7,000 feet above sea level:
Phase 1—Spend 3–5 days at approximately 9,000 feet. Do not exceed 11,000.
Phase 2—Spend at least 4–5 days at approximately 11,500 feet. Do not exceed 12,500 feet.
Phase 3—Spend at least 5–7 days at approximately 13,000 feet. Do not exceed 14,000 feet.
Phase 4—Sleep at 14,000–15,000 feet from then on. But the user should have had at least 12 consecutive days of acclimatization where he/she is exposed to altitude at least 6–8 hours per day. Do not exceed 15,000 feet at any time.

After a 2–3 day interruption go back one phase (e.g., if after four days at phase 3 and then three days at sea level; go back to phase 2.). After a 4–7 day interruption go back two phases (e.g., if after 5 days at phase 47 days are spent at sea level; go back to phase 2). After an interruption of more than 7 days or more go back to phase 1.

There are definite limits to how high an individual should go. There are no permanent human habitations above 17,500 feet. Among mountain climbers the altitudes above 18,000 feet are known as the deterioration zone and altitudes above 26,000 feet are called the death zone. Above this later altitude, there is simply inadequate oxygen for a normal healthy life. While humans can survive above 18,000 feet for a short time, fitness will definitely decrease above this elevation whatever else you may do. Accordingly, it is an aspect of the present invention that a user is alerted and/or one or more fans are activated when the simulated altitude rises above 15,000 feet.

In some embodiments, the Colorado Mountain Room 50 control panel is equipped with an alarm that sounds when the oxygen or carbon dioxide levels are outside their desired ranges. The alarm signals the user that the CMR 50 needs to be turned off and/or is malfunctioning.

In one embodiment the alarm is triggered at a simulated altitude of 16,500 feet. Additionally, the oxygen concentrator is turned off and the air intake fan is turned on. The fan will turn off at 14,800 feet.

In some embodiments of the invention, the alarm is triggered at $CO_2$ concentration of approximately 9,500 ppm. Additionally, the scrubber is set to high speed and the air intake fan is activated.

High carbon dioxide levels indicate either the absorbent material needs to be replaced or the scrubber is not running. If the scrubber is running and the carbon dioxide level does not drop change the absorbent and restart the CMR 50.

It is preferred that the present invention be used in conjunction with periodic tests of hematocrit or hemoglobin. Also recommended is the monitoring of $O_2$ saturation in the blood, and nucleated red cells/reticulocyte counts.

Since a Colorado Mountain Room 50 works by reducing the oxygen content of the air, it is important for implementing a substantially air tight stationary embodiment of the invention to select a room that can be made as air tight as possible. One preferred installation is an enclosure of 1,000 cubic feet with no more than two occupants; however, larger rooms with a larger number of occupants can be provided, e.g., for rooms of 30,000 cubic feet. The room should be sealed with paint and air sealing techniques as one skilled in the art will understand.

In one embodiment, the maximum size for a Colorado Mountain Room 50 is about 10 feet by 12 feet 6 inches with an 8-foot ceiling height or about 1,000 cubic feet. Of course, larger rooms can be accommodated with additional oxygen concentrators. Rooms with no exterior walls are easier to seal, control humidity levels, and provide with cooling and heating if necessary. Rooms and outside walls are affected by temperature and humidity differences between inside and outside the space and wind speeds, which affect the infiltration rates of the conditioned space. As the number of doors and windows increase the number of pathways for air infiltration increases. The number of penetrations for electrical outlets, lights, and plumbing fixtures also increases the number of pathways for air infiltration. Open floor plans that include large closets and or bathrooms increase the size of the room and the equipment requirements, and increase the difficulty of sealing the conditioned space.

The Colorado Mountain Room 50 works by reducing oxygen content in the air. To be effective you need a reasonably air tight room to avoid outside air from entering the room. Macklanburg Duncan (MD) manufactures weather stripping and sealing products that can be used to seal rooms effectively. Their website address is www.m-dteam.com and is a very informative site. MD produces a wide variety of products that are available at most home centers, hardware stores, and lumber companies.

Newer buildings tend to be constructed using materials and methods that reduce air infiltration to minimize heating and cooling needs. Buildings built before the 1970's may be more difficult to seal effectively due to the different construction materials and methods used at the time the building was built.

Most air leaks in rooms are from the following building components. Recommendations are included for each component.

1. Doors—A good quality door that closes easily and tightly is all that is necessary. A special door is not required. Use an adjustable door jam kit (weather-stripping, we recommend MD Flat Profile Door Jamb Weather-strip) to make the door as leak proof as possible. Install a wooden threshold and a "door sweep" or "bottom" (weather stripping that attaches to the bottom of the door, we recommend MD L-Shaped Door Bottom) to provide a seal at the bottom of the door. Single doors are easier to seal than double doors. Older French doors are difficult to seal effectively. Hinged doors are easier to seal than sliding doors.

2. Windows—Make sure the windows are shut tightly. No special windows are required, however the windows need to seal effectively, which may require installing new weather stripping to reduce air exchange from the outside. Older windows can be more difficult to seal, and older double hung windows are particularly difficult to seal. Windows need to be sealed between the window frame and the wall framing. The window trim should be caulked on the inside and outside of the room. On the inside of the room, caulk the edge of the trim where it meets the drywall and where it meets the window jamb. On the outside of the house caulk the edges of the window trim where it meets the siding and where it meets the window jamb. MD manufactures a product Shrink & Seal Indoor Kit for windows that will be difficult to seal. The product is a clear plastic film that tapes to the wall or trim around the window and completely seals the window.

3. Plumbing—Where pipes enter or exit the room (under sinks, behind toilets, in showers, and tubs) use caulk or plumbers putty to seal the area around the pipes. Modern plumbing codes require traps in drains. Consequently, drains are generally not a problem. Showers, tubs and sinks can be used normally without losing altitude. No special plumbing fixtures are required.

4. Ducts and Vents—These need to be blocked completely. Close the registers and seal the duct or vent opening using duct tape (available at any hardware store, K-mart, Target, etc.). It will look better and be more effective to remove the register or grille, seal the duct or vent several inches below the opening and then replace the register or grille in the opening. If the vent is large, you can tape a heavy-duty vinyl or urethane plastic sheet to the duct or vent. Seal off cold air returns and ventilation fans in the same way. When fan ducts are closed off be sure to remove the electrical power to the fan so it is not turned on. A fan blowing against a closed duct could cause the fan to overheat.

5. Electrical Outlets, Phone Jacks, Cable Jacks and Light Fixtures—Block unused electrical outlets with outlet plugs or covers, which are available at any hardware store. Seal the edges of switch, jack, outlet and light boxes with caulk where the box meets the drywall. Place foam seals under switch and outlet cover plates.

6. Walls and Ceilings—The materials used in the construction of the room impact the infiltration rate of the room. Drywall on the walls and ceiling is ideal. Repair any cracks with spackling compound, or caulk. We recommend that the walls and ceiling be painted with one coat of a high quality latex primer sealer, and two coats of a high quality latex paint. Paint requirements for walls that may be difficult to seal are listed under the Trouble shooting section.

7. Floor—Most modern flooring is sufficiently airtight. However, if there are obvious cracks in wooden flooring these should be filled or repaired to reduce outside airflow. Urethane coating of a leaky wooden floor may be sufficient to solve the problem. Even the worst floor can be made airtight with a heavy-duty plastic sheet placed over the floor, and sealed at the edges of the room with tape. You may then cover the plastic with ordinary carpeting or an appropriate sub floor and the flooring material of your choice.

8. Testing for Leakage—Once the Mountain Room equipment is installed turn it on and monitor the control panel display for the percentage of oxygen in the room. In a well-sealed room the percentage of oxygen will decrease to desired levels over a period of 8–10 hours (longer in large rooms).

9. Heat—Ordinary baseboard heating, available for about $75, or space heaters available for even less are sufficient to heat most rooms. No special heating is required.

10. Air Conditioning—Air conditioning is recommended to cool and dehumidify the air in the room. Split system air conditioners are required and are available through Carrier, General Electric and several other manufacturers. Split systems consist of two components, an indoor unit placed in the room to be cooled and an outdoor unit that houses the compressor and exhausts heat. These systems provide more cooling capacity, are easier to seal and are architecturally more attractive than window air conditioners. An air conditioner that does not bring in outside air, or exhaust indoor air is necessary to avoid interfering with the lowering of the oxygen concentration in the room. Window air conditioners often bring in outside air, which precludes their use in altitude simulation rooms. Single unit portable air conditioning systems will not work in an altitude room because they exhaust indoor air. Contact a local mechanical contractor for more information on split system air conditioners available in your area. The local contractor provides design and installation services and can assist you in choosing a system that cools and dehumidifies the room. Be sure to inform the contractor that the Mountain Room equipment produces heat so they can calculate the cooling load of the room including the heat generated by the concentrator and the scrubber (400 watts for the concentrator and 200 watts for the scrubber). Be certain that the air conditioner is sealed effectively when it is installed.

11. Humidifiers and Dehumidifiers—If air conditioning is not used a dehumidifier is recommended. Ordinary off the shelf units are fine. In some cases, a humidifier may be desired to increase humidity in rooms that are air-conditioned. Again, ordinary off the shelf units are fine.

Move the oxygen sensor around the room to locate areas in the room where the oxygen content is higher than the ambient level in the room. Find the point of entry and seal it. Doors, windows and electrical penetrations should be checked carefully. Continue locating and sealing leaks until the room remains at the desired oxygen concentration.

When oxygen levels at the wall are higher than the rest of the room and all penetrations are sealed use the following paint recommendations. Paint the walls, if you have not all ready done so, with one coat of a high quality latex primer sealer, and two coats of a high quality latex paint. If the walls are more air permeable than drywall in good condition the following paints or similar products are recommended. 1 coat Sherwin-Williams Preprite 200 Latex Primer (B28W200.) 2 Coats Sherwin-Williams Epolon II Multi-Mil Epoxy paint (B62-800 series.) If the walls are concrete, the following is recommended. 1 coat Sherwin-Williams Heavy Duty Block Filler (B42W46.) 2 coats Sherwin-Williams Epolon II Multi-Mil Epoxy (B62.) Any of the Epoxies come in any color you choose. Exposed wood ceilings and wood paneling without finished drywall underneath may be very difficult to seal effectively. An additional oxygen concentrator can be used to overpower the leaks in the room.

The Colorado Mountain Room 50 equipment can be placed in many different configurations. Placing the oxygen concentrator, control panel, and intake air assembly in the closet of the altitude simulation space provides an installation that maximizes useable floor space and minimizes the visual impact of the equipment.

Sensors should be placed close to the occupants in the enclosure but not so close that artificially high carbon dioxide readings occur. It is recommended that the sensors be placed about four to six feet away from the occupants. Sensors should be placed to monitor air from the room at large and not from inside the closet or behind furniture or drapes.

The carbon dioxide scrubber needs to be in the altitude simulation space and for best performance needs three feet of unobstructed air space around the outlet at the bottom of the scrubber. The scrubber can be placed in the closet next to or above the concentrator if there is enough air space around the scrubber. The scrubber weighs about forty-five pounds when the canister is full of absorbent material. The scrubber should be placed so it is easy to remove the canister for emptying and refilling. Try removing the empty canister from the scrubber at the desired location before filling the canister. It is much easier to remove the canister from the scrubber than to unplug and remove the entire scrubber every time the canister is refilled. Place the scrubber up off the floor to prevent water from contacting the base of the unit. Standing water around the base of the scrubber could contact electrical components in the base of the unit. If placed on light colored carpet place the scrubber on a small mat or rug to avoid discoloring the carpet.

The intake fan is the control mechanism for the invention in many embodiments. The fan has to be installed correctly and in good working order for the system to operate safely. The intake air fan should be installed about eye level, and should be placed as inconspicuously as possible. The fan needs to be positioned so it will not be obstructed or covered by furniture or items on closet shelves. The closet is a very good choice for locating the fan provided the closet wall adjoins an inside space that allows good airflow. Placing the fan in a closet will probably require leaving the closet door open even if the closet door is louvered. The fan requires a four-inch hole drilled through the walls of adjoining rooms.

Because the oxygen concentrator creates some heat, in one embodiment the oxygen concentrator is placed in an air-conditioned room. The concentrator of the present invention only requires plugging it into the scrubber, installing one hose to an outdoor space and turning it on.

In one embodiment the present invention can also include a carbon monoxide detector for detecting carbon monoxide in the enclosure. Uses For The Colorado Mountain Room 50:

The Colorado Mountain Room 50 may be used for providing the following conditions:

(a) High Altitude and Diabetes. The Colorado Mountain Room 50 system creates a low oxygen (hypoxic) or high oxygen (hyperoxic) environment. An oxygen sensor and a computerized controller 58 automatically monitor and control the oxygen partial pressure to maintain the desired altitude. Carbon Dioxide concentrations are automatically monitored and controlled by a $CO_2$ sensor, a computerized controller 58, a $CO_2$ scrubber, and a ventilation fan. Studies with animals suffering from Type-II Diabetes suggest that exposure to a high altitude environment produces metabolic changes that lead to a remission or cure of the disease. Although not bound by theory, the inventors believe that using the present method and system may lead to a remission or cure of Type-II Diabetes. The traditional therapies for Type-II Diabetes involve regular monitoring of blood glucose levels and the injection or ingestion of insulin. There is presently no cure for Type-II Diabetes.

(b) High Altitude and Coronary Heart Disease. The Colorado Mountain Room 50 system creates a low oxygen (hypoxic) or high oxygen (hyperoxic) environment. An oxygen sensor and a computerized controller 58 automatically monitor and control the oxygen partial pressure to maintain the desired altitude. Carbon Dioxide concentrations are automatically monitored and controlled by a $CO_2$ sensor, a computerized controller 58, a $CO_2$ scrubber, and a ventilation fan. Although not bound by theory, use of the present method and system may slow the progress of coronary heart disease or aid in the rehabilitation of those that suffer from it. The traditional preventative therapies for coronary heart disease include changes to the diet, increased exercise, and the cessation of risky behaviors (e.g. smoking and alcohol consumption). The traditional treatments for coronary heart disease include prescription medications and surgery.

(c) High Altitude and Stroke. The Colorado Mountain Room 50 system creates a low oxygen (hypoxic) or high oxygen (hyperoxic) environment. An oxygen sensor and a computerized controller 58 automatically monitor and control the oxygen partial pressure to maintain the desired altitude. Carbon Dioxide concentrations are automatically monitored and controlled by a $CO_2$ sensor, a computerized controller 58, a $CO_2$ scrubber, and a ventilation fan. Although not bound by theory, use of the present method and system may lessen the likelihood of stroke or aid in the rehabilitation of those that suffer a stroke. The traditional preventative therapies for stroke include changes to the diet, increased exercise, prescription medications, and the cessation of risky behaviors (e.g. smoking and alcohol consumption). The traditional treatments for stroke include prescription medications and surgery.

(d) High Altitude and Obesity. The Colorado Mountain Room 50 system creates a low oxygen (hypoxic) or high oxygen (hyperoxic) environment. An oxygen sensor and a computerized controller 58 automatically monitor and control the oxygen partial pressure to maintain the desired altitude. Carbon Dioxide concentrations are automatically monitored and controlled by a $CO_2$ sensor, a computerized controller 58, a $CO_2$ scrubber, and a ventilation fan. Although not bound by theory, use of the present method and system may act to control obesity. Prolonged exposure to high altitude is known to reduce the appetite and to produce changes in metabolism that may lead to weight loss. The traditional therapies for obesity include reducing the intake of calories, increasing exercise, prescription medications, and surgery.

(e) High Altitude and Cancer. The Colorado Mountain Room 50 system creates a low oxygen (hypoxic) or high oxygen (hyperoxic) environment. An oxygen sensor and a computerized controller 58 automatically monitor and control the oxygen partial pressure to maintain the desired altitude. Carbon Dioxide concentrations are automatically monitored and controlled by a $CO_2$ sensor, a computerized controller 58, a $CO_2$ scrubber, and a ventilation fan. Although not bound by theory, use of the present method and system may slow the progress of some types of cancer or aid in the rehabilitation of those that suffer from them. The traditional preventative therapies for cancer include changes to the diet, and the cessation of risky behaviors (e.g. smoking, sun exposure, and alcohol consumption). The traditional treatments for cancer include prescription medications, naturopathic remedies, surgery, radiation therapy, and chemical therapy.

(f) High Altitude and Smoking Cessation. The Colorado Mountain Room 50 system creates a low oxygen (hypoxic) or high oxygen (hyperoxic) environment. An oxygen sensor and a computerized controller 58 automatically monitor and control the oxygen partial pressure to maintain the desired altitude. Carbon Dioxide concentrations are automatically monitored and controlled by a $CO_2$ sensor, a computerized controller 58, a $CO_2$ scrubber, and a ventilation fan. Although not bound by theory, use of the present method and system may allow smokers to overcome their habit more easily. The traditional therapies for smoking cessation include willpower, medications, acupuncture, and hypnosis.

While various embodiments of the present invention have been described in detail, it will be apparent that further modifications and adaptations of the invention will occur to those skilled in the art. It is to be expressly understood that such modifications and adaptations are within the spirit and scope of the present invention.

What is claimed is:

1. A method for providing a desired enclosed atmospheric environment within an enclosure for changing a physical characteristic of a user periodically residing in the enclosed atmospheric environment and breathing the same, comprising:

first obtaining predictive data indicative of a future composition of constituent gases of said enclosed atmospheric environment, said predictive data being dependent upon each of (a) through (c) following:

(a) first data indicative of an expected gas exchange rate betweeen said enclosed atmospheric environment and an atmospheric environment external to said enclosue, wherein said enclosure is expected to have a first predetermined state related to a gas permeability therethrough;

(b) second data indicative of an approximate volume of said enclosure; and (c) third data indicative of an expected rate at which one or more devices, operably associated with said enclosure for changing said enclosed atmospheric environment, changes a relative amount of at least one of the gases of said enclosed atmospheric environment, said one or more devices including one or more of: an oxygen concentrator, a $CO_2$ scrubber and a nitrogen generator;

said predictive data selected from the group consisting of;
(a) data indicative of an oxygen volume in said enclosed environment;
(b) data indicative of an oxygen consumption by one or more users in said enclosed environment;
(c) data indicative of a rate of oxygen removal;
(d) data indicative of an amount of air exiting said enclosed environment through said enclosure;
(e) data indicative of an amount of air entering said enclosed environment through said enclosure;
(f) data indicative of a volume of $CO_2$ in said enclosed environment;
(g) data indicative of a volume of $CO_2$ being produced by one or more users;
(h) data indicative of a $CO_2$ production from one or more users of said enclosed environment;
(i) data indicative of a $CO_2$ portion of said air exchange rate exiting said enclosed environment;
(j) data indicative of a $CO_2$ portion of said air exchange rate entering said enclosed environment;
(k) data indicative of an amount of $CO_2$ removed from said enclosed environment by said $CO_2$ scrubber;
(l) data indicative of a relative amount of oxygen in said enclosed environment;
(m) data indicative of a simulated altitude in said enclosed environment; and
(n) data indicative of a concentration of $CO_2$ in said enclosed environment;

determining, using said predictive data, one or more components for providing an interior of said enclosure with a simulation of a desired altitude, said one or more components including said one or more devices for providing said future composition of constituent gases having a desired characteristic of said enclosed atmospheric environment indicative of the desired simulated altitude;

second providing control information for controlling a composition of constituent gases of said enclosed atmospheric environment for simulating said desired simulated altitude which is different from that of the atmospheric environment external to said enclosure;

wherein said control information is used in controlling said one or more devices for changing a composition of said constituent gases of said enclosed atmospheric environment.

2. A method for providing a desired enclosed atmospheric environment within an enclosure for changing a physical characteristic of a user periodically residing in the enclosed atmospheric environment and breathing the same, comprising:

first obtaining predictive data indicative of a future composition at constituent gases of said enclosed atmospheric environment, said predictive data being dependent upon each of (a) through (c) following:

(a) first dat indicative of an expected gas exchange rate betweeen said enclosed atmosnhetic environment and an atmospheric environment external to said enclosure, wherein said enclosure is expected to have a first predetermined state related to a gas permeability therethrough;

(b) second data indicative of an approximate volume of said enclosure; and (c) third data indicative of an expected rate at which one or more devices, operably associated with said enclosure for changing said enclosed atmospheric environment, changes a relative amount of at least one of the gases of said enclosed atmospheric environment, said one or more devices including one or more of; an oxygen concentrator, a $CO_2$ scrubber and a nitrogen generator;

determining, using said predictive data, one or more components for providing an interior of said enclosure with a simulation of a desired altitude, said one or more components including said one or more devices for providing said future composition of constituent gases having a desired characteristic of said enclosed atmospheric environment indicative of the desired simulated altitude;

second providing control information for controlling a composition of constituent gases of said enclosed atmospheric environment for simulating said desired simulated altitude which is different from that of the atmospheric environment external to said enclosure;

wherein said control information is used in controlling said one or more devices for changing a composition of said constituent gases of said enclosed atmospheric environment; and wherein said oxygen concentrator is one of the devices for providing the interior of said enclosure with a simulation of a desired altitude.

3. A method for providing a desired enclosed atmospheric environment within an enclosure for changing a physical characteristic of a user periodically residing in the enclosed atmospheric environment and breathing the same, comprising:

first obtaining predictive data indicative of a future composition of constituent gases of said enclosed atmospheric environment rapid predictive data being dependent on each of (a) through (c) following:

(a) first data indicative of an expected gas exchange rate between said enclosed atmospheric environment and an atmospheric environment external to said enclosure, wherein said enclosure is expected to have a first predetermined state related to a gas permeability therethrough;

(b) second data indicative of an aproximate volume of said enclosure; and (c) third data indicative of an exoected rate at which one or more devices, operably associated with said enclosure for changing said enclosed atmospheric environment, changes a relative amount of at least one of the gases of said enclosed atmospheric environment, said one or more devices including one or more of; an oxygen concentrator, a $CO_2$ scrubber and a nitrogen generator;

determining, using said predictive data, one or more components for providing an interior of said enclosure with a simulation of a desired altitude, said one or more components including said one or more devices for providing said future composition of constituent gases having a desired characteristic of said enclosed atmospheric environment indicative of the desired simulated altitude;

second providing control information for controlling a composition of constituent gases of said enclosed atmospheric environment fur simulating said desired simulated altitude which is different from that of the atmosoheric environment external to wherein said control information is used in controlling said one or more devices for changing a composition of said constituent gases of said enclosed atmospheric environment; and wherein said oxygen concentrator is outside said enclosure and is one of the devices for providing the interior of said enclosure with a simulation of a desired altitude.

4. A method for providing a desired enclosed atmospheric environment within an enclosure for changing a physical characteristic of a user periodically residing in the enclosed atmospheric environment and breathing the same, comprising:

first obtaining predictive data indicative of a future composition of constituent gases of said enclosed atmospheric environment, said predictive data being dependent upon each of (a) through (c) following:

(a) first data indicative of an expected gas exchange rate between said enclosed atmospheric environment and an atmospheric environment external to said enclosure, wherein said enclosure is expected to have a first predetermined state related to a gas permeability therethrough;

(b) second data indicative of an approximate volume of said enclosure; and (c) third data indicative of an expected rate at which one or more devices, operably associated with said enclosure for changing said enclosed atmospheric environment, changes a relative amount of at least one of the gases of said enclosed atmospheric environment, said one or more devices including one or more of; an oxygen concentrator, a $CO_2$ scrubber and a nitrogen generator;

determining, using said predictive data, one or more component for providing an interior of said enclosure with a simulation of a desired altitude, said one or more components including said one or more devices for providing said future composition of constituent gases having a desired characteristic of said enclosed atmospheric environment indicitive of the desired simulated altitude;

second providing control information for controlling a composition of constituent gases of said enclosed atmospheric environment for simulation said desired simulated altitude which is different from that of the atmospheric environment external to said enclosure;

wherein said control information is used in controlling said one or more devices for changing a composition of said constituent gases of said enclosed atmospheric environment; and wherein said oxygen concentrator, providing oxygen depleted air to the interior of said enclosure, is outside of said enclosure, and is one of the devices for providing the interior of said enclosure with a simulation of a desired altitude.

5. The method of claim 1, wherein the physical characteristic of a user is a reduction in appetite of said user.

6. The method of claim 2, wherein the physical characteristic of a user is a reduction in body weight of said user.

7. The method of claim 1, wherein said physical characteristic comprises the obesity of the user.

8. The method of claim 1, wherein said physical characteristic is associated with changes in a user's metabolism that leads to weight loss of said user.

9. The method of claim 1, further comprising repeating said method over a prolonged period of time in order to reduce the appetite of the user and to produce changes in the user's metabolism so as to promote weight loss of the user.

10. The method of claim 2, wherein the physical characteristic of a user is a reduction in a diabetic condition of the user.

11. The method of claim 2, wherein the physical characteristic of a user is a reduction in a coronary heart condition of the user.

12. The method of claim 2, wherein the physical characteristic of a user is a reduction in a proclivity of stroke of the user.

13. The method of claim 2, wherein the physical characteristic of a user is a reduction in a presence of cancer in the user.

14. The method of claim 2, wherein the physical characteristic of a user is a reduction in a lung condition of a user caused by smoking.

* * * * *

UNITED STATES PATENT AND TRADEMARK OFFICE
CERTIFICATE OF CORRECTION

PATENT NO. : 6,827,760 B2
DATED : December 7, 2004
INVENTOR(S) : Kutt et al.

It is certified that error appears in the above-identified patent and that said Letters Patent is hereby corrected as shown below:

Title page,
Item [56], References Cited, please insert the following under OTHER PUBLICATIONS:
-- "Colorado Mountain Roon" advertisement; *Colorado Altitude Training*; *VeloNews*; May 29, 2000; pg. 37.

"The Outer Limits"; *Outside Magazine*; June 2000; pgs. 1 and 2 of 3.

Email from Larry Kutt [kutt@altitudetraining.com] to Dana [cat@altitudetraining.com]; February 15, 2000; 2 pgs.

Web page: "Outside Online: The Hard Way"; *Outside Magazine*; October 2000; 2 pgs. --

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,827,760 B2
DATED : December 7, 2004
INVENTOR(S) : Kutt et al.

It is certified that error appears in the above-identified patent and that said Letters Patent is hereby corrected as shown below:

Column 1,
Line 9, delete "Povisional" and insert -- Provisional --.

Column 16,
After "Equation 2" delete the equation:
"$O_2$ Consumption by People at $t$ (liters)=(delta $t$ (min*People in Room *$0_2$ consumption rate (liters/min)*[Actual Pressure (mb)/Sea Level Pressure (mb)]" and insert:
-- $O_2$ Consumption by People at $t$ (liters)=(delta $t$ (min)*People in Room *$0_2$ consumption rate (liters/min)*[Actual Pressure (mb)/Sea Level Pressure (mb)] --.
to include a right parenthesis after "min".
After "Equation 13" delete the equation:
"$CO_2$ Concentration at $t$ (ppm)=[Equation 6+Equation7-Equation 8+Equation 9-Equation 10)*[1,000,000/Room Volume (liters)]" and insert
-- $CO_2$ Concentration at $t$ (ppm)=[Equation 6+Equation 7-Equation 8+Equation 9-Equation 10)*[1,000,000/Room Volume (liters)] --.
to include a space between "Equation" and "7".

Column 31,.
Line 27, delete "enclosue" and insert -- enclosure --.
Line 60, delete ";" and insert -- : --.

Column 32,
Line 42, delete "at" and insert -- of --.
Line 45, delete "dat" and insert -- data --.
Line 46, delete "atmosnhetic" and insert -- atmospheric --.
Line 57, delete ";" and insert -- : --.

Column 33,
Line 20, delete "environment rapid" and insert -- environment, said --.
Line 21, delete "on" and insert -- upon --.
Line 27, delete "aproximate" and insert -- approximate --.
Line 29, delete "exoected" and insert -- expected --.
Line 37, delete ";" and insert -- : --.
Line 47, delete "fur" and insert -- for --.
Line 49, delete "atmosoheric" and insert -- atmospheric -- and insert -- said enclosure; -- after "external to".

UNITED STATES PATENT AND TRADEMARK OFFICE
CERTIFICATE OF CORRECTION

PATENT NO. : 6,827,760 B2
DATED : December 7, 2004
INVENTOR(S) : Kutt et al.

It is certified that error appears in the above-identified patent and that said Letters Patent is hereby corrected as shown below:

<u>Column 34,</u>
Line 13, delete ";" and insert -- : --.
Line 17, delete "component" and insert -- components --.
Line 22, delete "indicitive" and insert -- indicative --.
Line 26, delete "simulation" and insert -- simulating --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,827,760 B2
DATED : December 7, 2004
INVENTOR(S) : Kutt et al.

It is certified that error appears in the above-identified patent and that said Letters Patent is hereby corrected as shown below:

<u>Title page,</u>
Item [56], References Cited, please insert the following under OTHER PUBLICATIONS:
-- "Colorado Mountain Room" advertisement; *Colorado Altitude Training*; *VeloNews*; May 29, 2000; pg. 37.

"The Outer Limits"; *Outside Magazine*; June 2000; pgs. 1 and 2 of 3.

Email from Larry Kutt [kutt@altitudetraining.com] to Dana [cat@altitudetraining.com]; February 15, 2000; 2 pgs.

Web page: "Outside Online: The Hard Way"; *Outside Magazine*; October 2000; 2 pgs. --.

<u>Column 1,</u>
Line 9, delete "Povisional" and insert -- Provisional --.

<u>Column 16,</u>
After "Equation 2" delete the equation:
"$O_2$ Consumption by People at $t$ (liters)=(delta $t$ (min*People in Room *$0_2$ consumption rate (liters/min)*[Actual Pressure (mb)/Sea Level Pressure (mb)]" and insert:
-- $O_2$ Consumption by People at $t$ (liters)=(delta $t$ (min)*People in Room *$0_2$ consumption rate (liters/min)*[Actual Pressure (mb)/Sea Level Pressure (mb)] --.
to include a right parenthesis after "min".
After "Equation 13" delete the equation:
"$CO_2$ Concentration at $t$ (ppm)=[Equation 6+Equation7-Equation 8+Equation 9-Equation 10)*[1,000,000/Room Volume (liters)]" and insert
-- $CO_2$ Concentration at $t$ (ppm)=[Equation 6+Equation 7-Equation 8+Equation 9-Equation 10)*[1,000,000/Room Volume (liters)] --.
to include a space between "Equation" and "7".

<u>Column 31,</u>
Line 47, delete "enclosue" and insert -- enclosure --.
Line 60, delete ";" and insert -- : --.

<u>Column 32,</u>
Line 42, delete "at" and insert -- of --.
Line 45, delete "dat" and insert -- data --.
Line 46, delete "atmosnhetic" and insert -- atmospheric --.
Line 57, delete ";" and insert -- : --.

UNITED STATES PATENT AND TRADEMARK OFFICE
CERTIFICATE OF CORRECTION

PATENT NO. : 6,827,760 B2
DATED : December 7, 2004
INVENTOR(S) : Kutt et al.

It is certified that error appears in the above-identified patent and that said Letters Patent is hereby corrected as shown below:

Column 33,
Line 20, delete "environment rapid" and insert -- environment, said --.
Line 21, delete "on" and insert -- upon --.
Line 28, delete "aproximate" and insert -- approximate --.
Line 30, delete "exoected" and insert -- expected --.
Line 36, delete ";" and insert -- : --.
Line 48, delete "fur" and insert -- for --.
Line 50, delete "atmosoheric" and insert -- atmospheric -- and after "external to" insert -- said enclosure --.

Column 34,
Line 12, delete ";" and insert -- : --.
Line 16, delete "component" and insert -- components --.
Line 21, delete "indicitive" and insert -- indicative --.
Line 25, delete "simulation" and insert -- simulating --.

This certificate supersedes Certificate of Correction issued April 26, 2005 and December 27, 2005.

Signed and Sealed this

Second Day of May, 2006

JON W. DUDAS
*Director of the United States Patent and Trademark Office*

US006827760C1

(12) EX PARTE REEXAMINATION CERTIFICATE (9660th)
United States Patent
Kutt et al.

(10) Number: US 6,827,760 C1
(45) Certificate Issued: *May 16, 2013

(54) METHOD AND SYSTEM FOR PROVIDING A DESIRED ATMOSPHERE WITHIN AN ENCLOSURE

(75) Inventors: Lawrence M. Kutt, Boulder, CO (US); Mark Jellison, Boulder, CO (US); Joseph Boatman, Boulder, CO (US)

(73) Assignee: Stephen C. Nevin, Highlands Ranch, CO (US)

Reexamination Request:
No. 90/012,253, Apr. 12, 2012

Reexamination Certificate for:
Patent No.: 6,827,760
Issued: Dec. 7, 2004
Appl. No.: 10/423,692
Filed: Apr. 25, 2003

Certificate of Correction issued Apr. 26, 2005
Certificate of Correction issued Dec. 27, 2005
Certificate of Correction issued May 2, 2006

(*) Notice: This patent is subject to a terminal disclaimer.

Related U.S. Application Data

(63) Continuation of application No. 09/948,410, filed on Sep. 6, 2001, now Pat. No. 6,565,624.

(60) Provisional application No. 60/230,946, filed on Sep. 6, 2000.

(51) Int. Cl.
*A61G 10/02* (2006.01)
*A61G 10/00* (2006.01)

(52) U.S. Cl.
USPC ...... 95/8; 128/202.12; 128/205.26; 55/385.2; 95/11; 95/25; 95/26; 96/111; 96/115; 96/116; 96/117

(58) Field of Classification Search
None
See application file for complete search history.

(56) References Cited

To view the complete listing of prior art documents cited during the proceeding for Reexamination Control Number 90/012,253, please refer to the USPTO's public Patent Application Information Retrieval (PAIR) system under the Display References tab.

*Primary Examiner* — Terrence Till

(57) ABSTRACT

A system and method for passive hypoxic training provides a person with a low oxygen (hypoxic) environment. Oxygen sensors automatically monitor and control oxygen levels to maintain the altitude desired. $CO_2$ levels are monitored and $CO_2$ is eliminated so that the air a person breathes is substantially clean and fresh. Exposure to a high altitude environment produces physiological changes in a person's body, which becomes more efficient at absorbing and transporting oxygen. Using the present method and system, athletes obtain the benefits of sleeping at a simulated altitude in the user's own home for six to twelve hours, rather than traditional altitude therapies in which athletes spend two to three weeks at high altitude before an athletic competition to obtain similar benefits. This system allows for "live high train low" altitude training that has been shown in controlled studies to provide superior benefits to "live high train high" training.

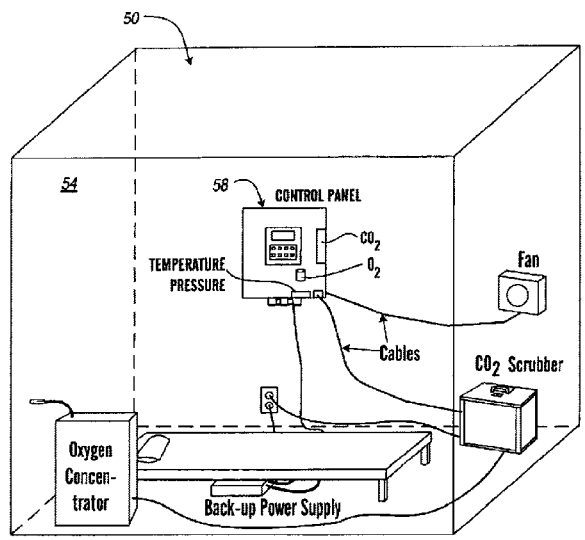

Portable CMR, configured for use as a high altitude room.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4 are cancelled.

Claims 5-14 were not reexamined.

* * * * *